(12) United States Patent
Hur et al.

(10) Patent No.: US 12,549,763 B2
(45) Date of Patent: Feb. 10, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Hyejung Hur, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 284 days.

(21) Appl. No.: 17/769,172

(22) PCT Filed: Aug. 26, 2020

(86) PCT No.: PCT/KR2020/011361
§ 371 (c)(1),
(2) Date: Apr. 14, 2022

(87) PCT Pub. No.: WO2021/080152
PCT Pub. Date: Apr. 29, 2021

(65) Prior Publication Data
US 2024/0064332 A1 Feb. 22, 2024

(30) Foreign Application Priority Data
Oct. 24, 2019 (KR) .......................... 10-2019-0132962

(51) Int. Cl.
*H04N 19/597* (2014.01)
*H04N 19/119* (2014.01)
(Continued)

(52) U.S. Cl.
CPC ......... *H04N 19/597* (2014.11); *H04N 19/119* (2014.11); *H04N 19/124* (2014.11); *H04N 19/96* (2014.11)

(58) Field of Classification Search
CPC .. H04N 19/597; H04N 19/119; H04N 19/124; H04N 19/96; G06T 9/00; G06T 9/40
See application file for complete search history.

(56) References Cited

U.S. PATENT DOCUMENTS

2017/0214943 A1* 7/2017 Cohen .................... H04N 19/62

FOREIGN PATENT DOCUMENTS

KR 20090087667 8/2009
KR 20090087667 A * 8/2009
(Continued)

OTHER PUBLICATIONS

Mammou et al., "G-PCC Codec Description v2," International Organization for Standardization, ISO/IEC JTC1/SC29/WG11 N18189 ; Marrakech, MA; Jan. 2019 (Year: 2019).*

(Continued)

*Primary Examiner* — Zaihan Jiang
*Assistant Examiner* — Tyler B Edwards
(74) *Attorney, Agent, or Firm* — Fish & Richardson P.C.

(57) ABSTRACT

A point cloud data transmission method according to embodiments may include the steps of: encoding point cloud data; and transmitting a bitstream including the point cloud data. A point cloud data reception method according to embodiments may include the steps of: receiving a bitstream including point cloud data; and decoding the point cloud data.

14 Claims, 30 Drawing Sheets

(51) Int. Cl.
   *H04N 19/124*   (2014.01)
   *H04N 19/96*    (2014.01)

(56)           References Cited

FOREIGN PATENT DOCUMENTS

KR      20180087348      8/2018
WO      WO2019055772     3/2019
WO      WO2019140508     7/2019

OTHER PUBLICATIONS

International Search Report and Written Opinion in International Appln. No. PCT/KR2020/011361, dated Dec. 3, 2020, 16 pages (with English translation).
Mammou et al., "G-PCC codec description v2," International Organisation for Standardisation, ISO/IEC JTC1/SC29/WG11 N18189, Jan. 2019, Marrakech, MA, 39 pages.

* cited by examiner

FIG. 6
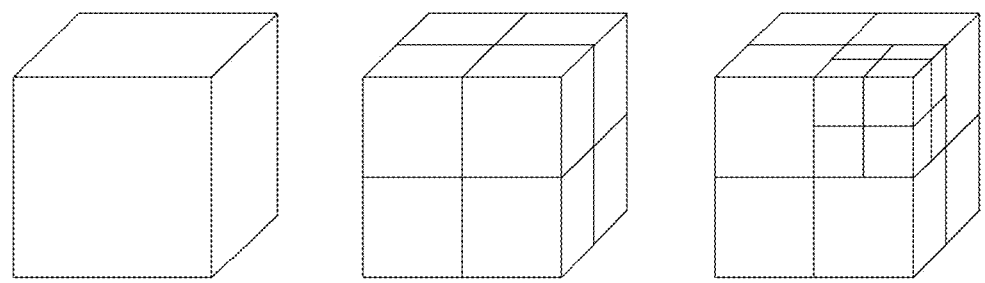
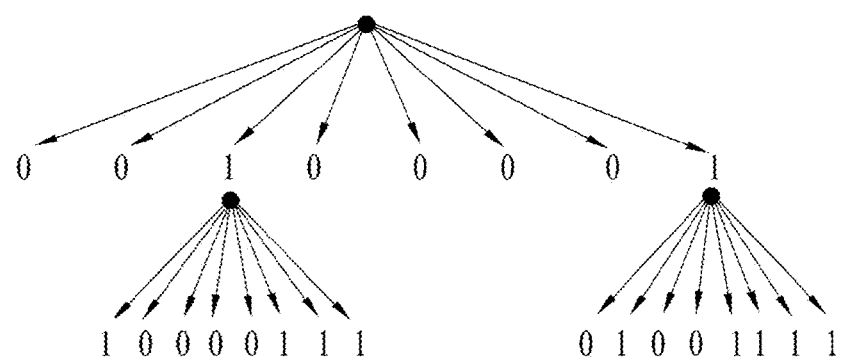

FIG. 7
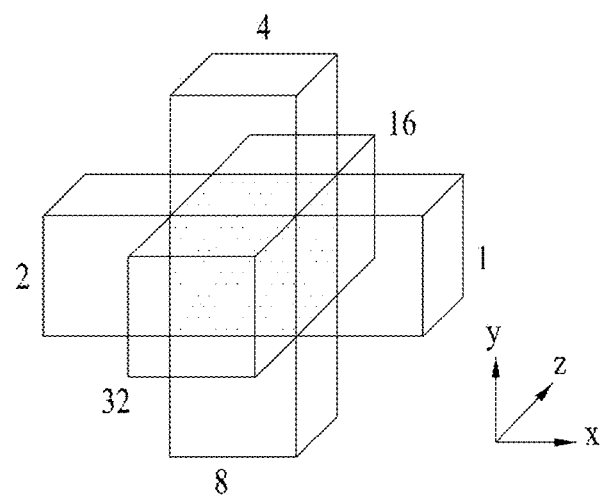
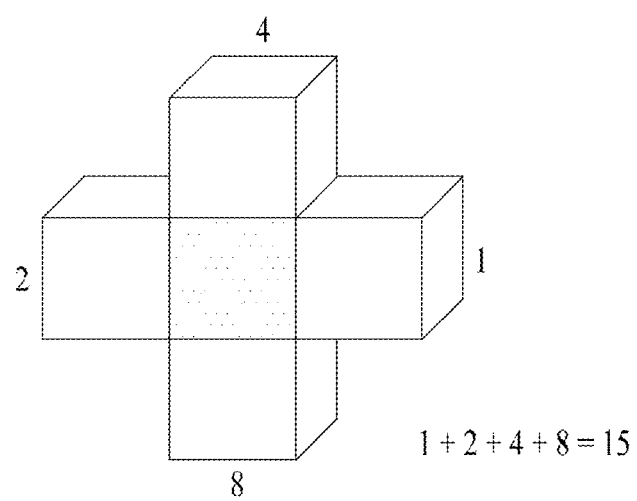
1 + 2 + 4 + 8 = 15

FIG. 27

| seq_parameter_set_rbsp(){ | Descriptor |
|---|---|
| profile_idc | U(8) |
| profile_compatibility_flags | U(24) |
| ... | |
| sps_num_attribute_sets | UE(v) |
| for( i=0; i<sps_num_attribute_sets; i++){ | |
| attribute_dimension[ i ] | UE(v) |
| attribute_instance_id[ i ] | UE(v) |
| ... | |
| slice_partition_method_type | UE(2) |
| if(slice_partition_method_type>0) { | |
| slice_partition_octree_subnode_arrangement type | UE(8) |
| slice_partition_min_num_points_per_slice | UE(v) |
| slice_partition_max_num_points_per_slice | UE(v) |
| } | |
| } | |
| ... | |
| byte_alignment() | |
| } | |

FIG. 28

| tile_parameter_set(){ | Descriptor |
|---|---|
| num_tile | UE(v) |
| for( i=0; i<num_tiles; i++){ | |
| tile_bounding_box_offset_x[ i ] | UE(v) |
| tile_bounding_box_offset_y[ i ] | UE(v) |
| ... | |
| slice_partition_method_type | UE(2) |
| if(  slice_partition_method_type>0) { | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Stage application under 35 U.S.C. § 371 of International Application No. PCT/KR2020/011361, filed on Aug. 26, 2020, which claims the benefit of Korean Application No. 10-2019-0132962, filed on Oct. 24, 2019. The disclosures of the prior applications are hereby incorporated by reference herein in their entirety.

TECHNICAL FIELD

Embodiments relate to a method and apparatus for processing point cloud content.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide an apparatus and method for efficiently processing point cloud data. Embodiments provide a point cloud data processing method and apparatus for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages and in accordance with the purpose of the disclosure, as embodied and broadly described herein, a method of receiving point cloud data may include receiving a bitstream containing the point cloud data, and decoding the point cloud data.

In another aspect of the present disclosure, a method of transmitting point cloud data may include encoding the point cloud data, and transmitting a bitstream containing the point cloud data.

Advantageous Effects

Apparatuses and methods according to embodiments may process point cloud data with high efficiency.

The apparatuses and methods according to the embodiments may provide a high-quality point cloud service.

The apparatuses and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 27 shows a sequence parameter set (SPS) according to embodiments;

FIG. 28 shows a tile parameter set (TPS) according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
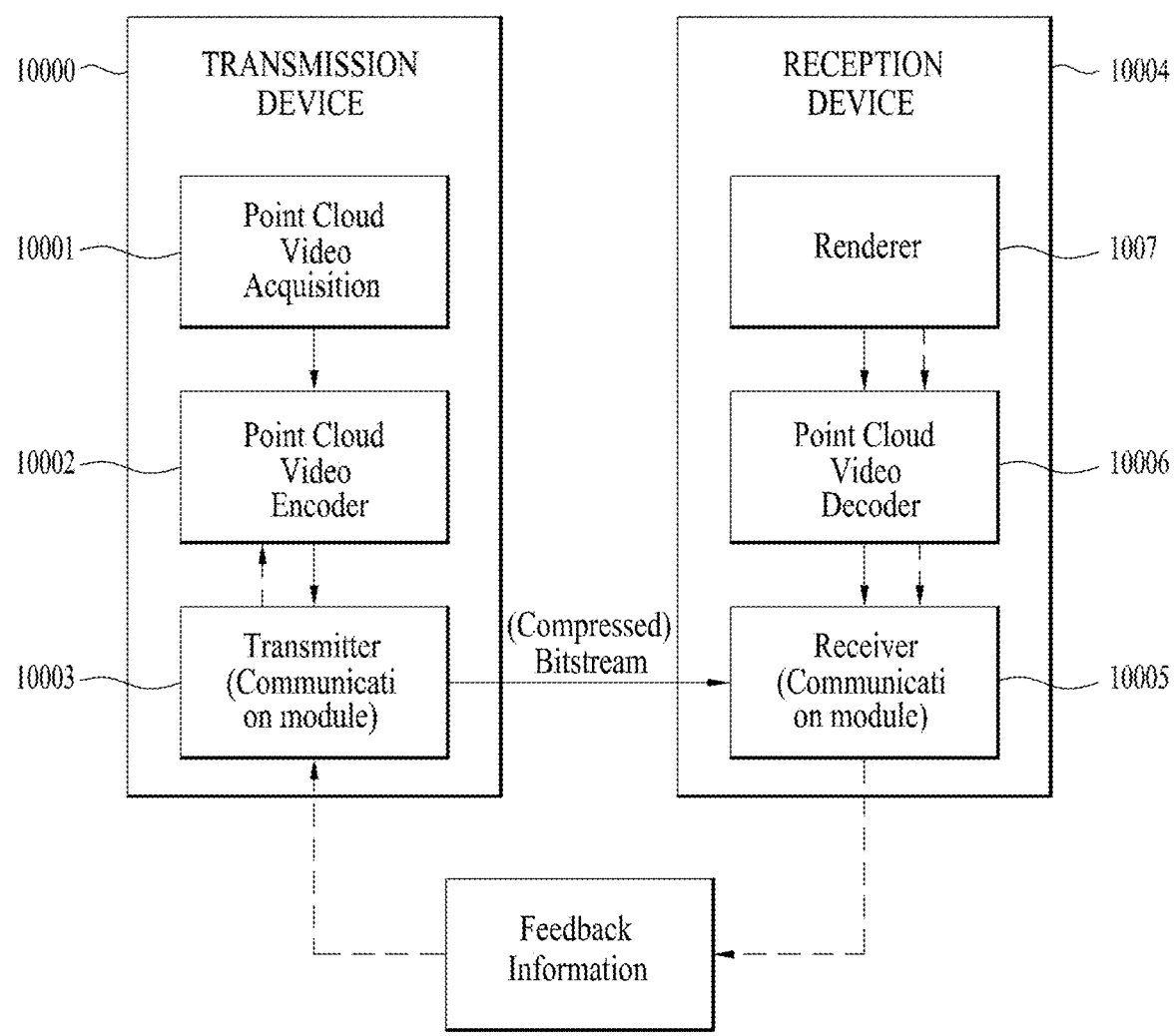
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
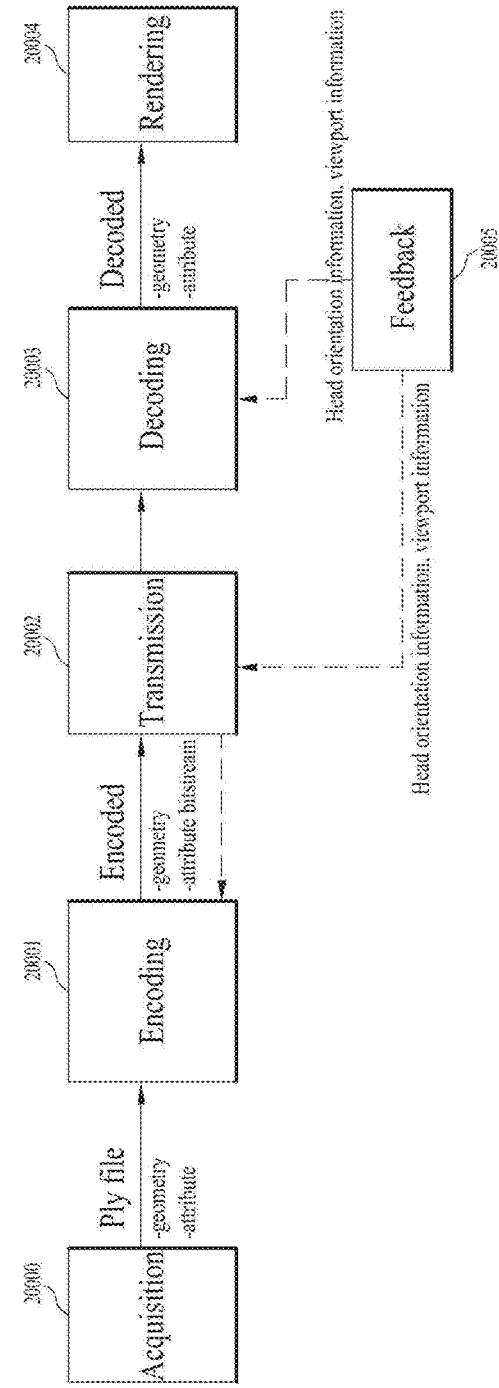
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance.

According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
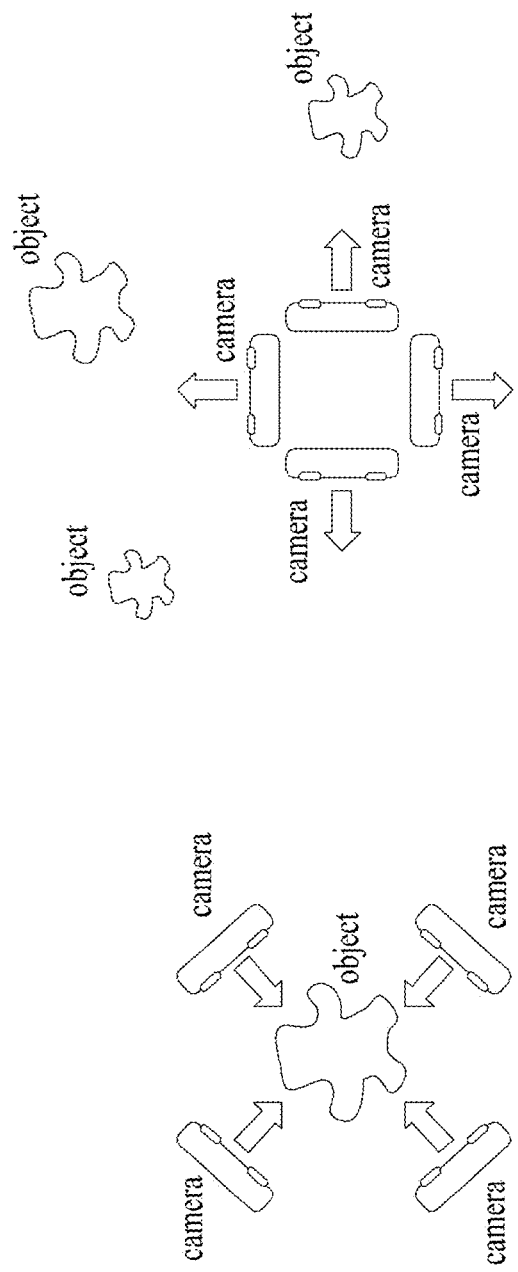
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
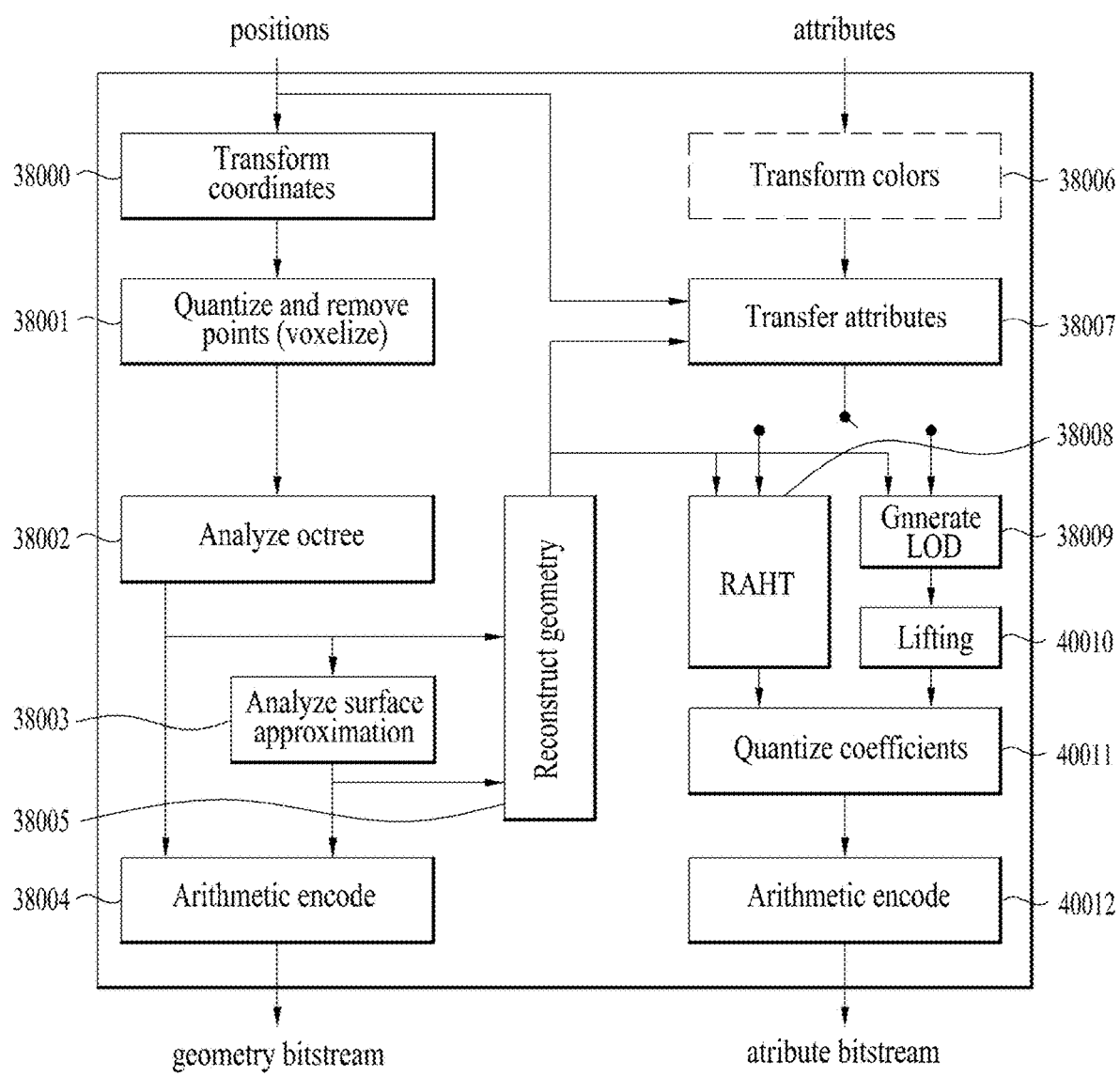
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing apparatus, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
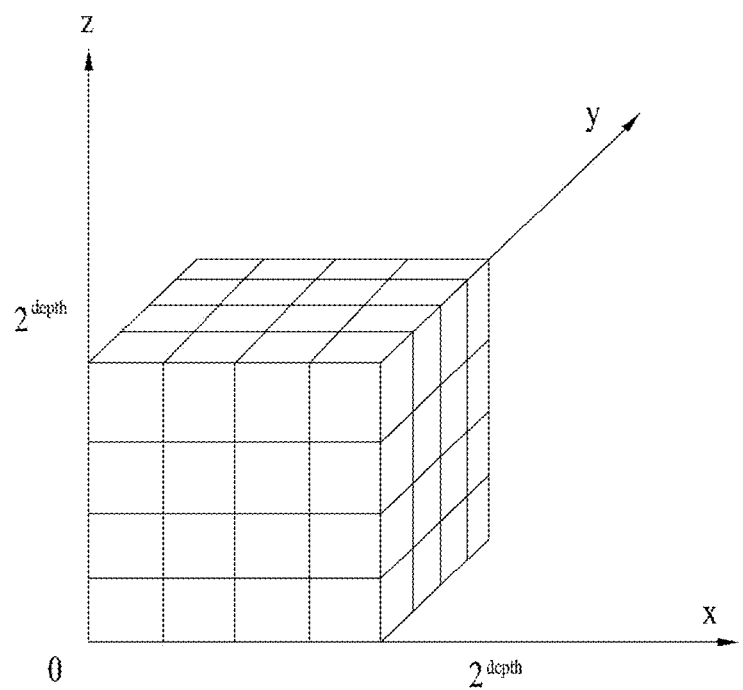
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and (2d, 2d, 2d). Here, 2d may be set to a value constituting the smallest bounding box surrounding all points of the point cloud content (or point cloud video). Here, d denotes the depth of the octree. The value of d is determined in the following equation. In the following equation, (xintn, yintn, zintn) denotes the positions (or position values) of quantized points.

$$d = \text{Ceil}(\text{Log } 2(\text{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix}; \quad \text{i)}$$

$$\begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \quad \text{ii)}$$

$$\begin{bmatrix} \sigma_x^2 \\ \sigma_y^2 \\ \sigma_z^2 \end{bmatrix} = \sum_{i=1}^{n} \begin{bmatrix} \overline{x}_i^2 \\ \overline{y}_i^2 \\ \overline{z}_i^2 \end{bmatrix} \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of 0 is estimated through a tan 2(bi, ai), and the vertices are ordered based on the value of 0. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1 Triangles formed from vertices ordered 1, . . . , n n triangles
3 (1, 2, 3)
4 (1, 2, 3), (3, 4, 1)
5 (1, 2, 3), (3, 4, 5), (5, 1, 3)
6 (1, 2, 3), (3, 4, 5), (5, 6, 1), (1, 3, 5)
7 (1, 2, 3), (3, 4, 5), (5, 6, 7), (7, 1, 3), (3, 5, 7)
8 (1, 2, 3), (3, 4, 5), (5, 6, 7), (7, 8, 1), (1, 3, 5), (5, 7, 1)
9 (1, 2, 3), (3, 4, 5), (5, 6, 7), (7, 8, 9), (9, 1, 3), (3, 5, 7), (7, 9, 3)
10 (1, 2, 3), (3, 4, 5), (5, 6, 7), (7, 8, 9), (9, 10, 1), (1, 3, 5), (5, 7, 9), (9, 1, 5)
11 (1, 2, 3), (3, 4, 5), (5, 6, 7), (7, 8, 9), (9, 10, 11), (11, 1, 3), (3, 5, 7), (7, 9, 11), (11, 3, 7)
12 (1, 2, 3), (3, 4, 5), (5, 6, 7), (7, 8, 9), (9, 10, 11), (11, 12, 1), (1, 3, 5), (5, 7, 9), (9, 11, 1), (1, 5, 9)

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 2³=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The upper part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The lower part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
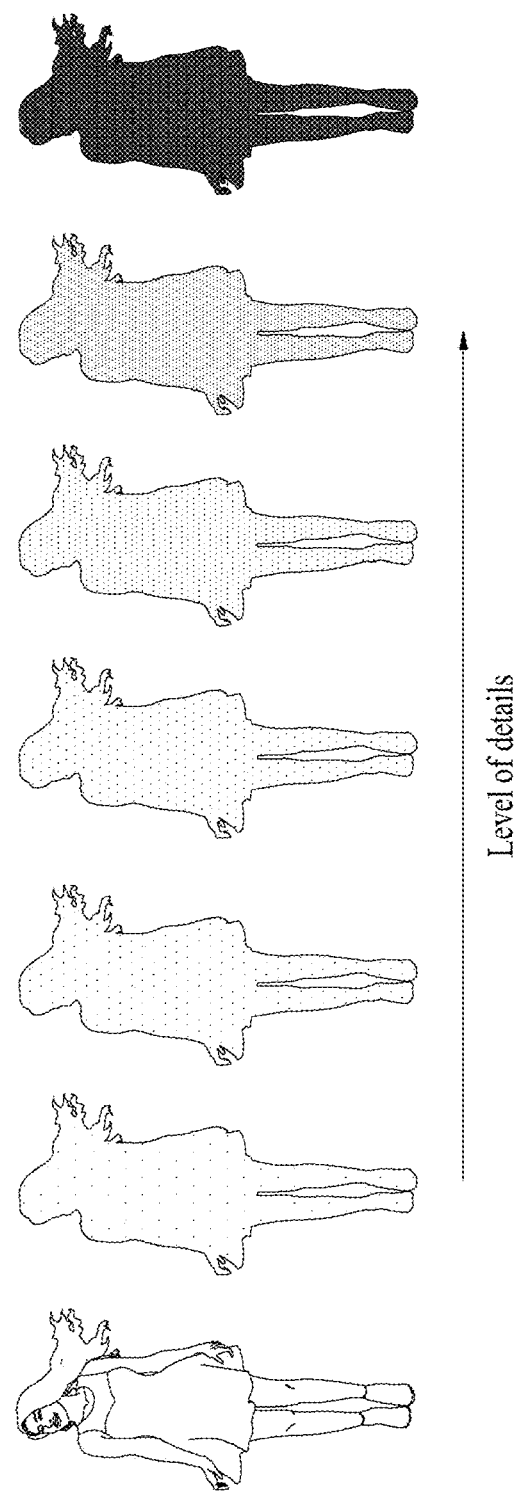
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
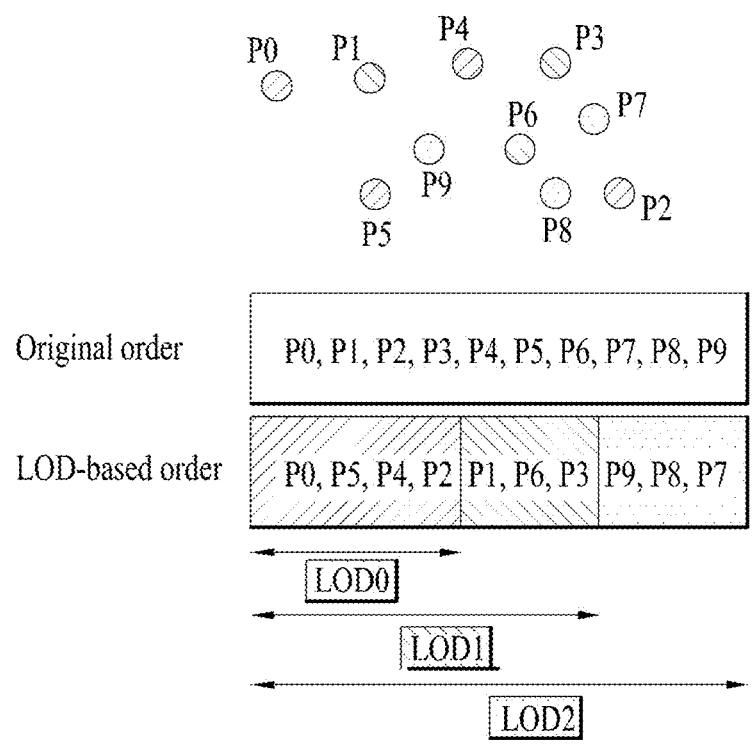
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE Attribute prediction residuals quantization pseudo code
int PCCQuantization(int value, int quantStep) {
if( value >=0) {
return floor(value / quantStep + 1.0 / 3.0);
} else {
return -floor(-value / quantStep + 1.0 / 3.0);
}
}

TABLE Attribute prediction residuals inverse quantization pseudo code
int PCCInverseQuantization(int value, int quantStep) {
if( quantStep == 0) {
return value;
} else {
return value * quantStep;
}
}

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix},$$

$$T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

Figure 10:
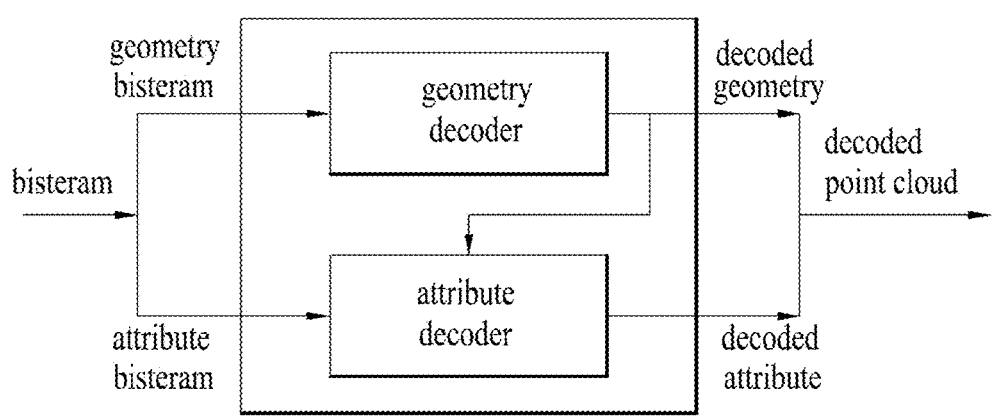
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
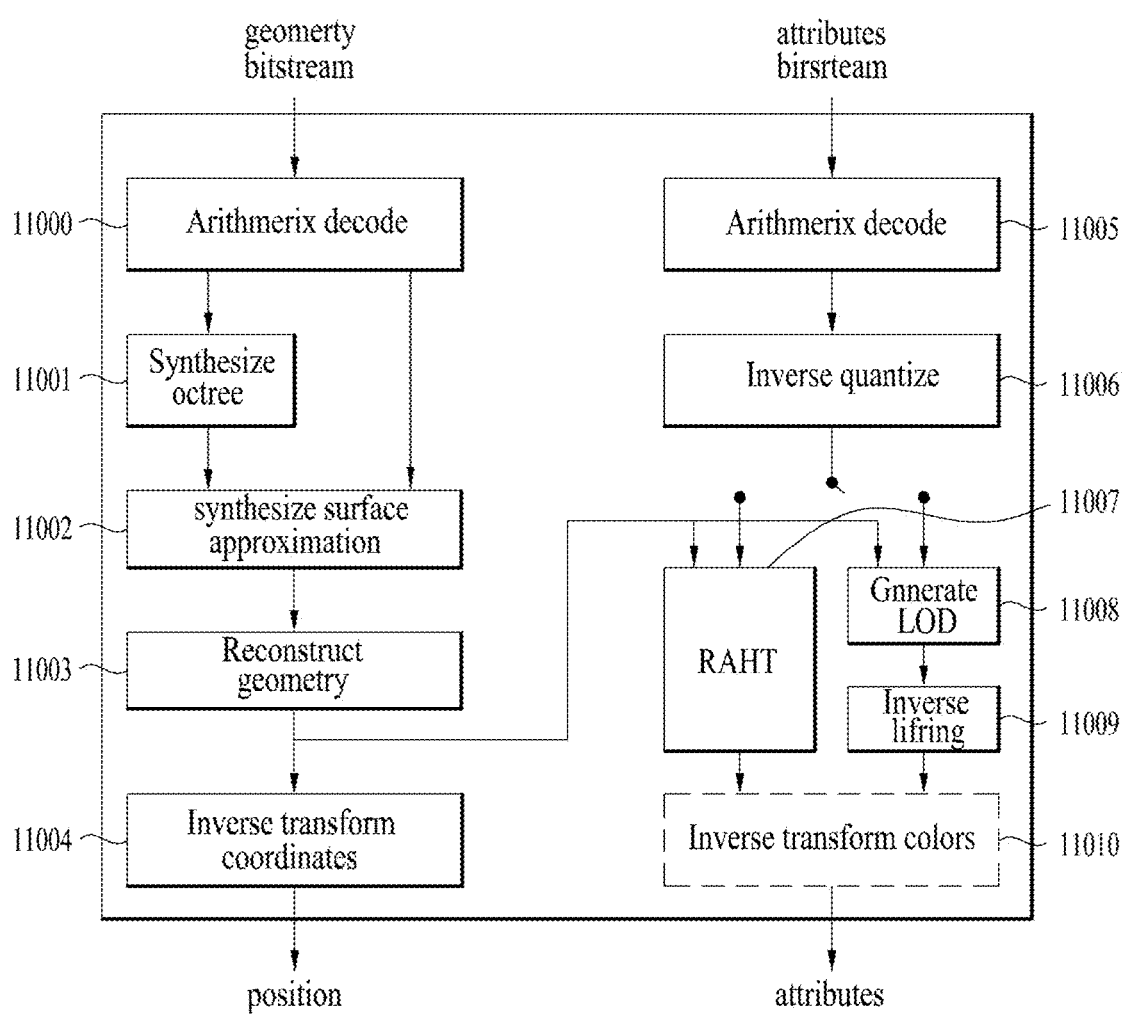
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is a reverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as a reverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
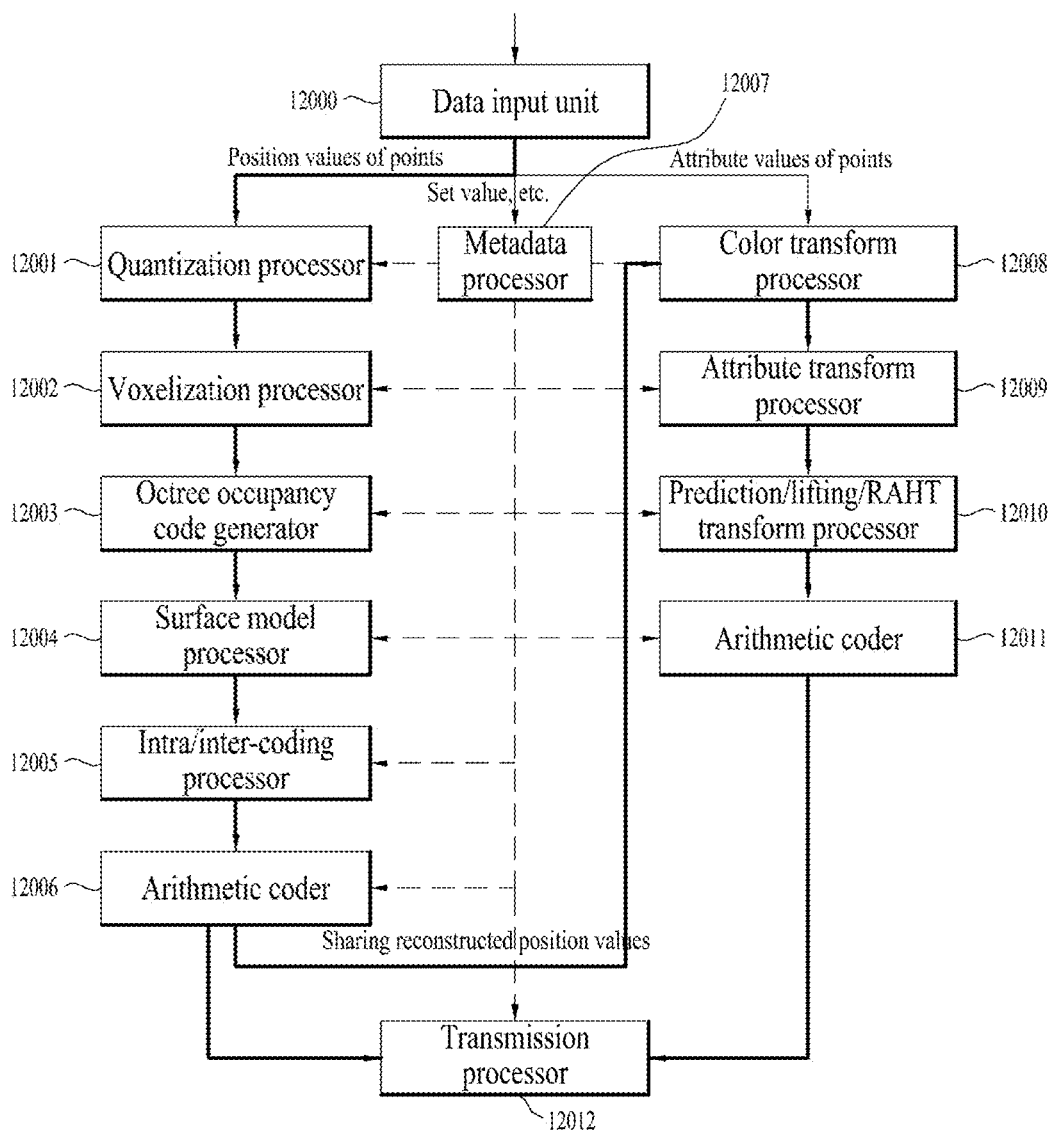
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
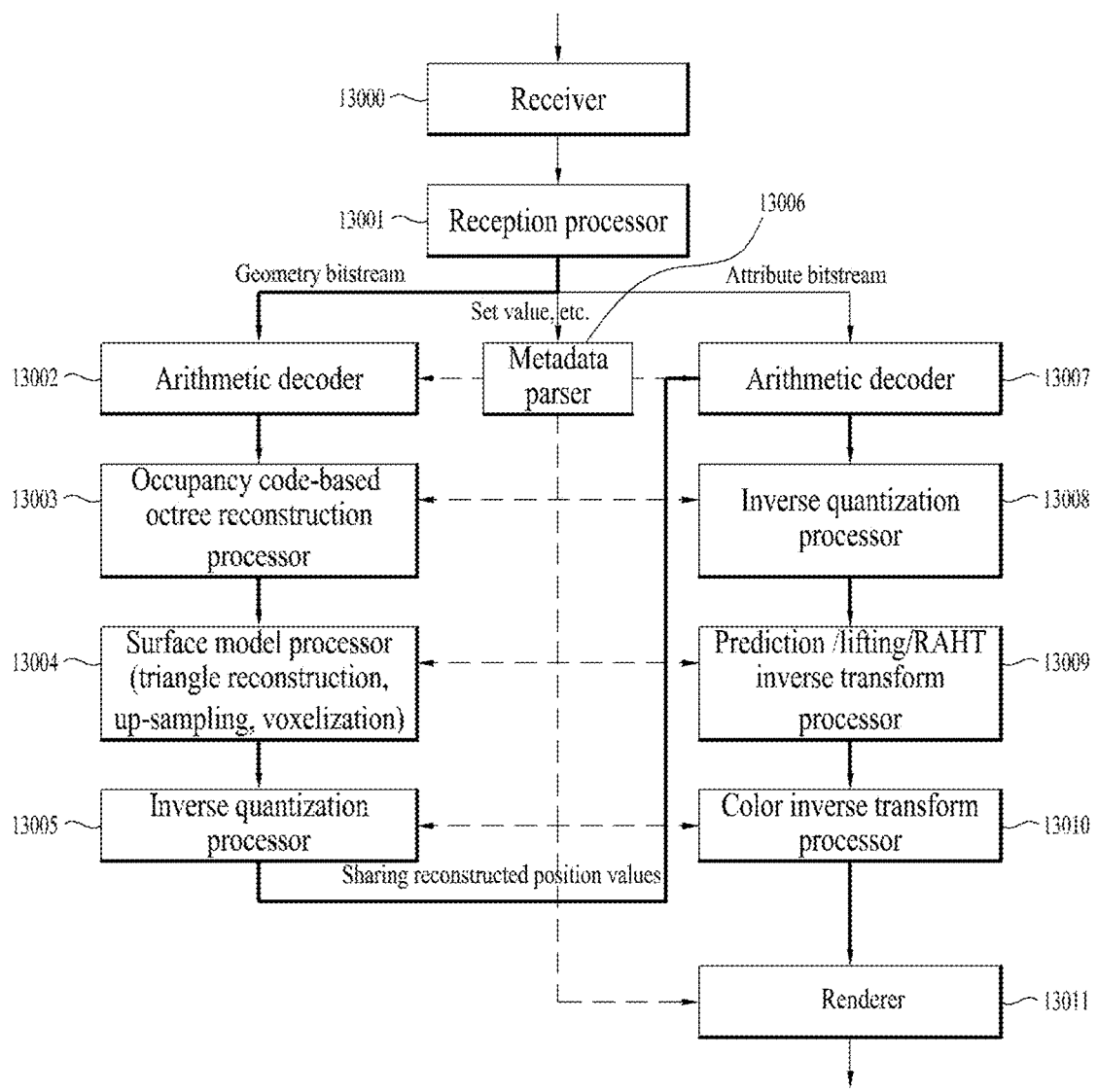
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. A detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
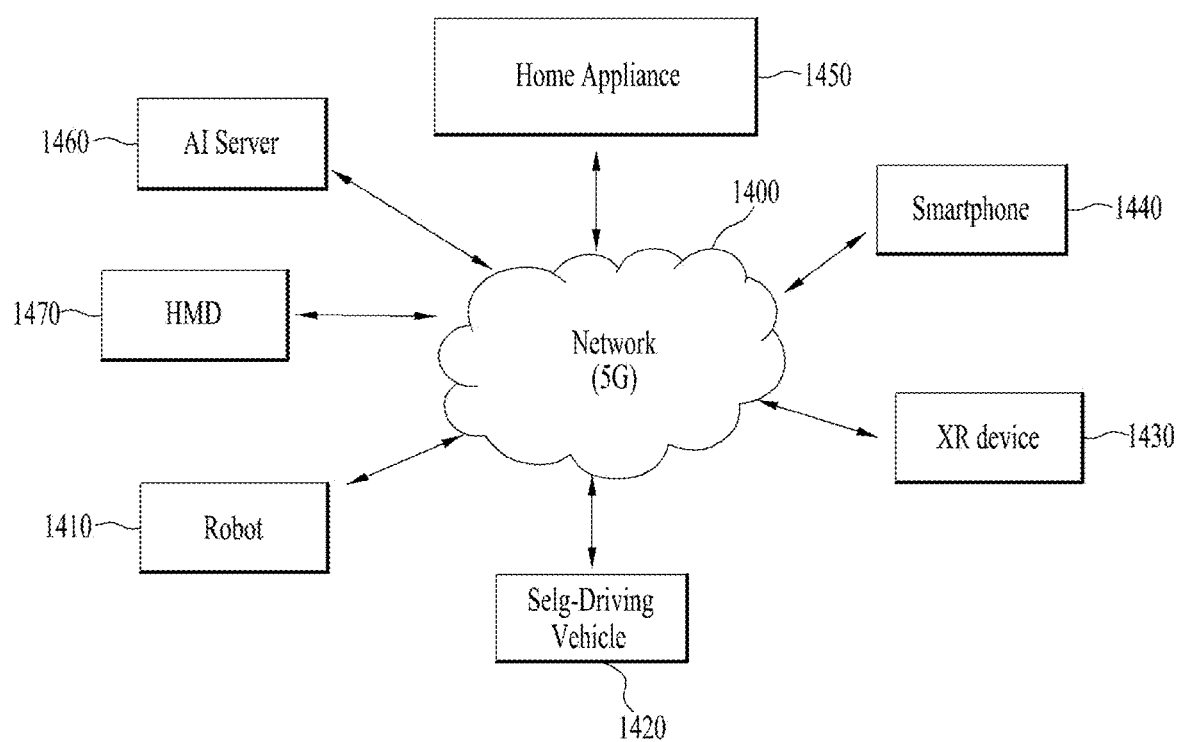
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission/reception device according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

The PCC data encoder according to the embodiments may correspond to an encoding device, an encoder, a point cloud transmission device, a point cloud data encoder, and the like.

The PCC data decoder according to the embodiments may correspond to a decoding device, a decoder, a point cloud reception device, a point cloud data decoder, and the like.

According to embodiments, geometry may be referred to as geometry information, geometry data, or the like, and an attribute may be referred to as attribute information, attribute data, or the like.

The method/device according to the embodiments may refer to a method/device for transmitting or receiving point cloud data according to embodiments.

Figure 15:
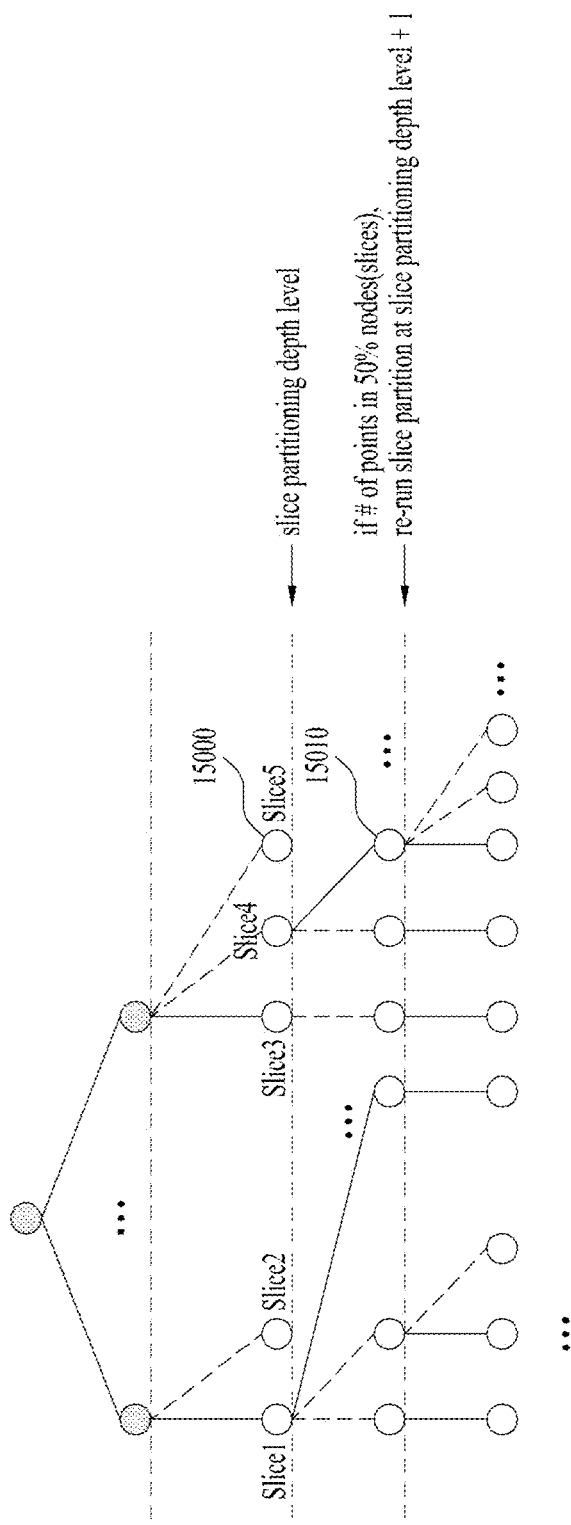
FIG. 15 illustrates octree-based partitioning according to embodiments.

FIG. 15 illustrates octree-based partitioning according to embodiments.

The partitioning in FIG. 15 may be performed in encoding the point cloud data or decoding the point cloud data, and specifically, may be performed by the transmission device 10000 of FIG. 1, the point cloud video encoder 10002 of FIG. 1, and the encoding 20001 of FIG. 2, the encoder of FIG. 4, the transmission device of FIG. 12, the XR device 1430 of FIG. 14, or the like. Also, the partitioning in FIG. 15 may be performed by the reception device 10004 of FIG. 1, the point cloud video decoder 140006 of FIG. 1, the decoding 20003 of FIG. 2, the decoder of FIG. 10, the decoder of FIG. 11, the reception device of FIG. 13, the XR device 1430 of FIG. 14, or the like.

Embodiments relate to a slice partitioning type for efficiently performing geometry-based point cloud compression (G-PCC) for 3D point cloud data compression. Embodiments may provide effects such as real-time, low-delay, and random access.

Regarding the slice partitioning type according to the embodiments, slice partitioning based on the length of the geometry (e.g., partitioning the long axis of the geometry by the short axis) or octree-based slice partitioning (e.g., partitioning by a specific octree node), or the like may be performed.

The slice partitioning according to the embodiments enable efficient parallel processing.

A slice represents a unit including points, and an encoder and a decoder according to embodiments may encode and decode the point cloud data based on the slice.

To increase parallel processing efficiency, a slice may need to have an appropriate number of points. Accordingly, the minimum number of points and the maximum number of points may be required. That is, the number of points may be important for the parallel processing.

In embodiments, partitioning may be performed at a specific depth of an octree for each node of the octree. Here, the specific depth of the octree is not a leaf node, and accordingly the node may be large. That is, the number of points included in the node may be large. Therefore, there may not be an appropriate number of points in partitioning, and all nodes may be configured into slices, such that the number of points in a slice may be scanned.

For example, when the number of points is as small as 50% or lower, the slice may be removed and slicing may be repeated. This operation according to the embodiments may be inefficient and latency-prone due to repetition of the operation of scanning the number of points and creating a slice. Accordingly, efficient, low-latency slice partitioning according to embodiments is proposed.

The method/device according to the embodiments may measure the number of slices in nodes at a specific depth. When the number of slice-related points is small, the method/device may visit a child node of the node and measure the number of slices again.

The embodiments will propose an improved octree-based slice partitioning scheme that may efficiently utilize the advantages of the octree-based structure. This may improve the slice partitioning speed. The method/device may provide an improved octree-based slice partitioning scheme and/or a signaling scheme for supporting the scheme.

A point cloud is composed of a set of points, and each of the points may include geometry information and attribute information. The geometry information includes three-dimensional position (XYZ) information, and the attribute information includes color (RGB, YUV, etc.) and/or reflectance values. The G-PCC encoding operation may include compressing the geometry and compressing the attribute information based on the geometry reconstructed with position information changed through compression (reconstructed geometry=decoded geometry). The G-PCC decoding operation may include receiving an encoded geometry bitstream and attribute bitstream, decoding geometry, and decoding attribute information based on the geometry reconstructed through the decoding (See FIGS. 4 and 11).

Point cloud content and/or an object included in the content may be one person or multiple people, such as an actor, or one thing or multiple things. In addition, the content that becomes the point cloud data may be a map in autonomous driving in a larger range, or a map in indoor navigation of a robot. In this case, it may be a huge amount of data that is locally linked. Such content cannot be encoded/decoded at once. Therefore, the data may be partitioned before the point cloud content is compressed. A tile (or 3D tile) may be configured as a rectangular prism formed by partitioning a space. For example, in a building, room #101 may be partitioned into one tile and room #102 may be partitioned into another tile. In order to support fast encoding/decoding by applying parallelization to the partitioned tiles, the tiles may be partitioned into slices again. This operation may be referred to as slice partitioning. Each slice may be a unit of a bitstream that may be independently decoded. That is, a spatially partitioned tile may be divided into slices for fast and efficient processing. The definition of a slice may include the following condition. The decoded points should be kept in the decoder so as not to overlap with each other.

In ideal slice partitioning, a partitioned slice may contain about 1.1 million points. Accordingly, when the number of points belonging to a slice obtained by slice partitioning is greater than 1,100,000, a splitting operation may be performed. When the number of points is less than 1,100,000, a merging operation may be additionally performed. The number of points included in a slice may be set differently according to embodiments.

For example, in ISO/IEC JTC 1/SC29/WG11-coding of moving pictures and audio (Oct. 23, 2019), octree-based slice partitioning partition points into nodes at a specific depth level of the octree. After partitioning, it may be checked whether each node has 1,100,000 points. When it is determined that 50% or more of the nodes (or slices) have an appropriate number of points, the splitting/merging operation may be performed on neighbor nodes (or slices). When it is not determined that 50% or more of the nodes have an appropriate number of points, the depth level of the octree may be adjusted one step higher (toward the bottom or the leaf nodes) and the slice partitioning operation may be performed again.

Referring to FIG. 15, the method/device according to the embodiments may generate an octree based on points of point cloud data as shown in FIG. 15 and perform slice partitioning based on the octree. At a specific level (or depth) 15000 of the octree, points included in a node may be partitioned into slices. When slice 1, slice 2, slice 3, slice 4, and slice 5 are generated for respective nodes, it may be checked whether the proportion of slices including an appropriate number of points among the five slices is 50% or more. When the proportion of slices including an appropriate number of appropriate points among the five slices is less than 50%, the level of the octree may be raised and slice partitioning may be performed again at nodes of the next level 15010.

According to embodiments, the method/device according to the embodiments may change the LOD and re-perform slice partitioning, ignoring the slice(s) generated in the previous level. Here, for the LOD, the root is 0 and the leaf is the depth. The index of LOD increases from the root to the leaf.

The method of octree-based partitioning according to the embodiments is configured such that after partitioning is fully performed, the partitioning is performed again when a condition is not met, and then the splitting/merging is performed again. Accordingly, the method may be inefficient depending on the situation. The partitioning scheme that is carried out inefficiently may be less effective in terms of real-time operation and low delay.

An additional description will be given of an operation capable of providing effects such as real-time operation, low-delay, and random access while more efficiently performing octree-based point cloud slice partitioning according to embodiments.

Figure 16:
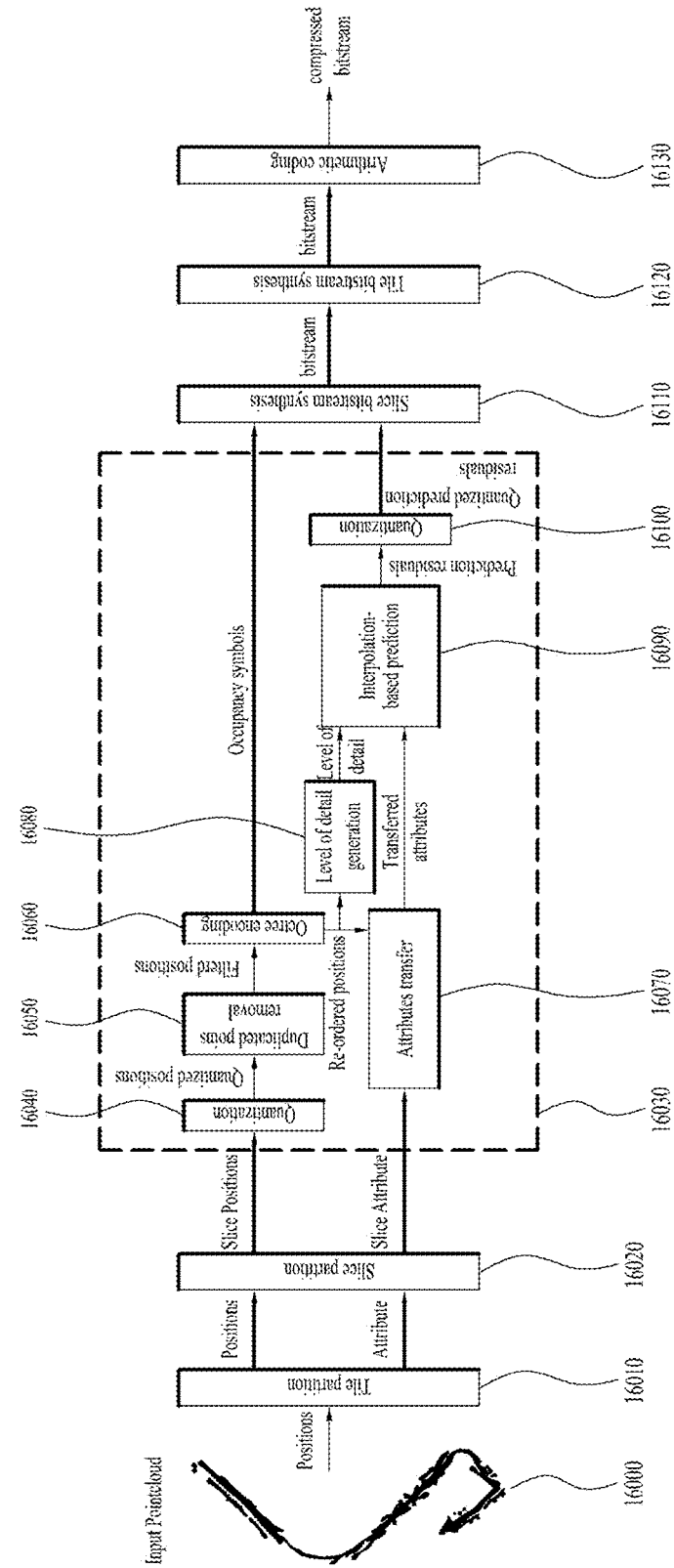
FIG. 16 illustrates a tile and/or slice partitioning and compression procedure according to embodiments.

FIG. 16 illustrates a tile and/or slice partitioning and compression procedure according to embodiments.

FIG. 16 illustrates a procedure of encoding geometry data and/or attribute data included in point cloud data and transmitting a bitstream of the point cloud data. The procedure of FIG. 16 may be performed by the transmission device 10000 of FIG. 1, the point cloud video encoder 10002, the encoding 20001 of FIG. 2, the encoder of FIG. 4, the transmission device of FIG. 12, the XR device 1430 of FIG. 14, or the like. In FIG. 16, the partitioning of FIG. 15 may be performed.

Each component in FIG. 16 may correspond to hardware, software, a processor, and/or a combination thereof.

Point cloud data 16000 is points having a position (geometry) and attribute(s) of the point cloud data processed by the method/device according to the embodiments.

A tile partitioner 16010 may partition points (positions) based on tiles. A tile is a spatial partition unit of data in which positions are distributed. When data is divided (partitioned), the point cloud data may be partitioned into one or more tiles.

Figure 25:
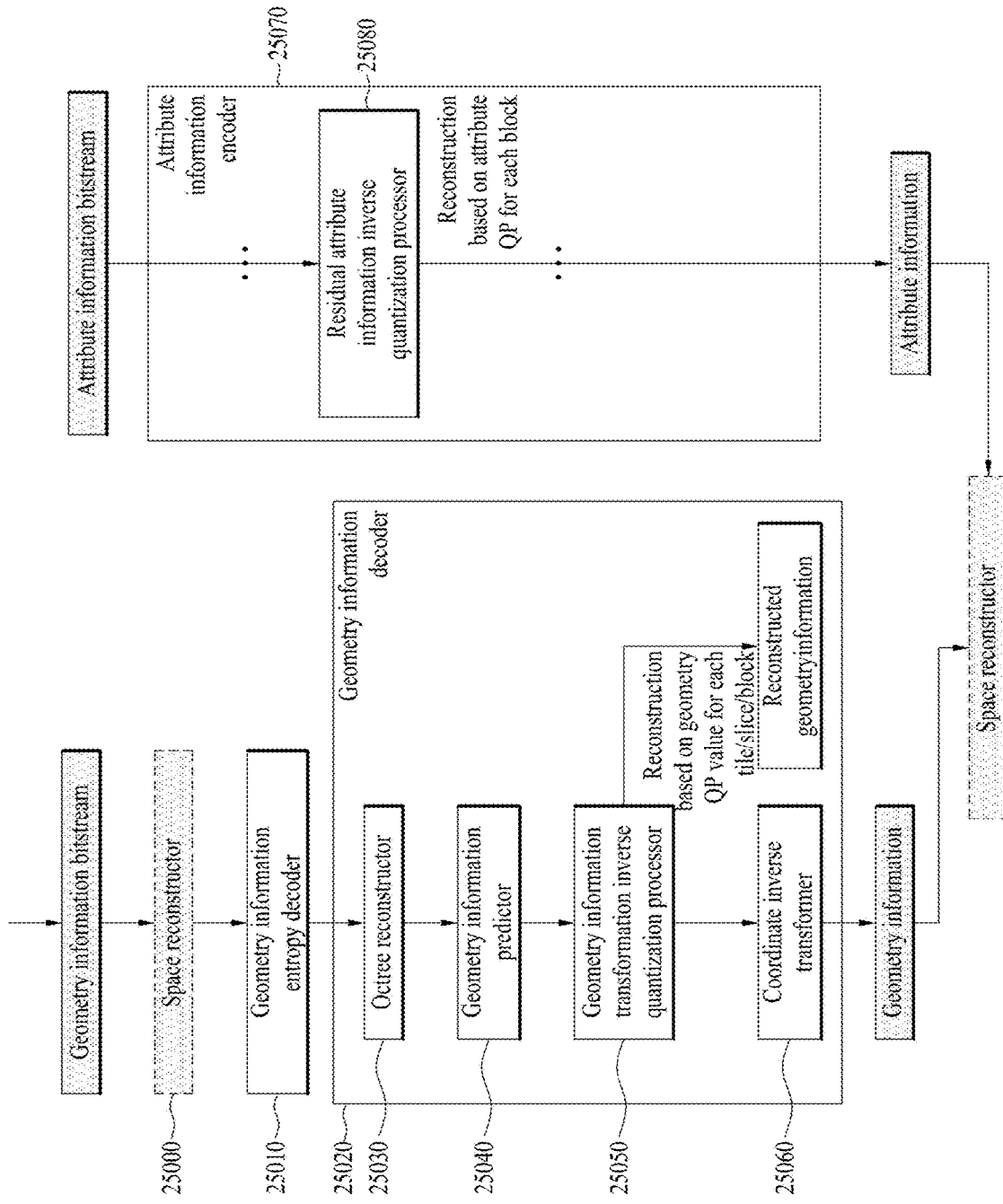
FIG. 25 illustrates a PCC decoder according to embodiments.

A slice partitioner 16020 may partition geometry data (positions and attribute data based on slices. A slice is a unit for partitioning geometry data and/or attribute data. Encoding and/or decoding may be performed based on units of slices. Referring to FIG. 25, geometry data and attribute data may be included in each slice. The geometry data may include a slice header and slice data. The attribute data may include a slice header and slice data.

A PCC encoder 16030 may encode the geometry data and/or the attribute data based on slices. The PCC encoder may include the following component(s).

A quantizer 16040 may quantize slice geometry data. The geometry data may be quantized based on a quantization value, as shown in FIG. 5.

When points within one node (one voxel) are duplicated based on the quantized geometry data, a duplicated point remover 16050 may remove duplicated points. As the duplicated point(s) are removed, position information about the geometry may be rearranged. The duplicated point removal operation may be selectively performed when duplicate points occur.

An octree encoder 16060 may generate an octree based on the geometry data as shown in FIG. 6 and encode the geometry data based on the octree. When duplicated points are removed, the octree may be encoded based on the filtered positions.

An attribute transmitter 16070 may receive the slice attribute data and deliver the attributes to an LOD generator and/or a predictor (prediction-based interpolator).

An LOD generator 16080 may receive an octree of the geometry data, receive the attribute data, and generate LODs as shown in FIGS. 8 and 9.

The prediction-based interpolator 16090 may receive the attribute data as in the attribute coding 40009 and 40010 of FIG. 4, receive the LODs, and perform prediction-based interpolation. Rather than encoding and transmitting the point cloud data as it is, the interpolator may efficiently transmit a residual based on the predicted value.

A quantizer 16100 may quantize a prediction residual as in the quantization 40011 of FIG. 4.

A slice bitstream synthesizer 16110 may generate a slice bitstream including encoded geometry data and encoded attribute data.

A tile bitstream synthesizer 16120 may generate a tile bitstream including a slice including encoded geometry data and encoded attribute data.

Figure 26:
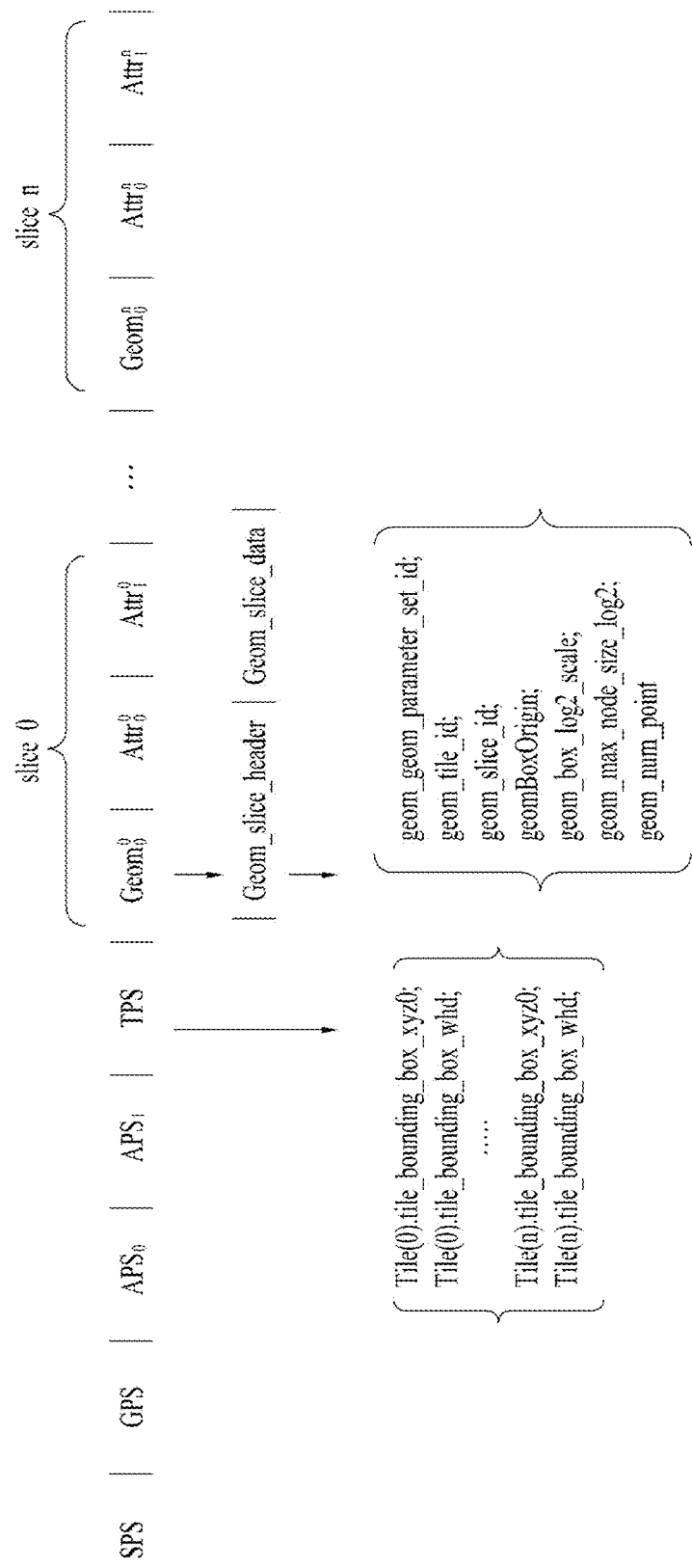
FIG. 26 shows the configuration of a bitstream including point cloud data according to embodiments.

An arithmetic coder 16130 may encode the bitstream based on an arithmetic coding scheme. The transmission method/device according to the embodiments may transmit a PCC bitstream as shown in FIG. 26.

As shown in FIG. 16, embodiments provide an improved octree-based slice partitioning scheme that may efficiently utilize the advantages of the octree-based structure.

When the PCC encoder compresses point cloud data, a tile/slice partitioning operation may be performed before the geometry compression operation, and the space may be reconstructed by the PCC decoder.

Figure 17:
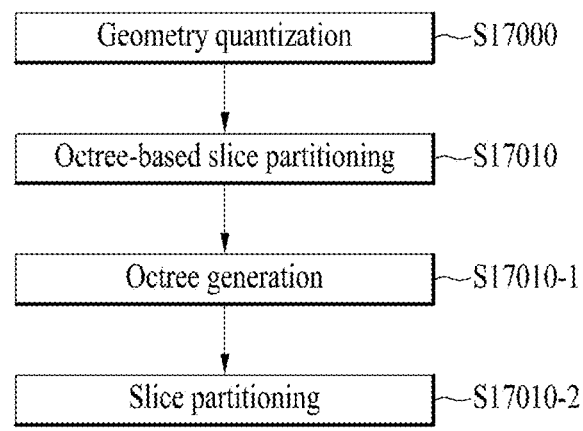
FIG. 17 shows a flowchart of octree-based slice partitioning according to embodiments.

FIG. 17 shows a flowchart of octree-based slice partitioning according to embodiments.

FIG. 17 illustrates slice partitioning performed by a transmission/reception device, an encoder, a decoder, and the like corresponding to FIG. 16.

The method/device according to the embodiments may perform a combination including at least one of the following operations.

S17000 Geometry Quantization

The method/device according to the embodiments may quantize the geometry before partitioning the point cloud.

According to embodiments, as shown in FIG. 16, tile/slice partitioning 16010 and 16020 is performed and quantization 16040 is performed. According to embodiments, the quantization 16040 may be performed before or after the partitioning 16010 and 16020, and/or quantization may be applied to different degrees (before and after the partitioning). That is, the order of the quantization/partitioning may be applied differently according to embodiments.

For example, in an embodiment, geometry quantization may be performed first, and then partitioning such as slice partitioning may be performed. In another embodiment, partitioning such as slice partitioning may be performed first, and then geometry quantization may be performed. When quantization is performed after partitioning, the positions of the geometry may be changed. The method/device according to the embodiments may quantize geometry data, generate an octree based on the quantized geometry data, and perform slice partitioning based on the octree.

S17010 Octree-Based Slice Partitioning

The method/device according to the embodiments may partition a slice based on a geometry position value of a quantized point. The slice partitioning according to the embodiments may include a uniform geometry technique and an octree-based slicing technique.

In the octree-based slicing technique, an ideal number of points in a slice may be considered.

S17010-1 Octree Generation

The method/device according to the embodiments may generate an octree based on a geometry position value of a quantized point. Each node of the octree may have the number of points belonging to the node region. This may correspond to octree generation in the operation of geometry encoding. The operation of generating an octree will be described with reference to FIG. 18.

S17010-2 Slice Partitioning

The octree-based slice partitioning for the method/device according to the embodiments may include an operation of searching for an appropriate number of nodes for slice configuration while traversing the octree in a pre-order.

An ideal range of the number of slices may be specified as r0 to r1 ($=1,100,000 \mp \alpha$). Here, $\alpha$ may be set to an appropriate level. According to embodiments, when a is specified as 500, r0 and r1 may be set as r0=1,099,500 and r1=1,100,500. The number of 1,1000,000, the range, and the value of a may all be changed according to embodiments. According to embodiments, the range may be referred to as a first range, a range including a first value and a second value, or the like. According to embodiments, the range of r0 to r1 and the range adjustment variable a may have optimized values for encoding/decoding, may be input by the user, or may be set from the system according to the transmission/reception device according to the embodiments.

The method/device according to the embodiments may perform a node visit according to a pre-order traverse scheme in order to separate points into slices according to the number according to the embodiments. The pre-order traverse scheme may be referred to as a first scheme, a specific order, or the like.

Figure 18:
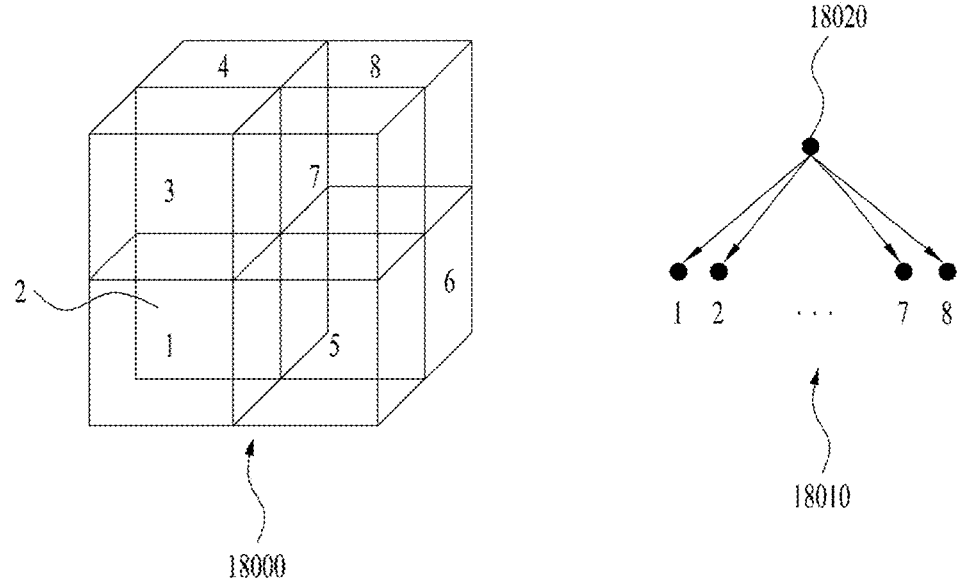
FIG. 18 shows octree sub-node regions and a tree order according to embodiments.

FIG. 18 shows octree sub-node regions and a tree order according to embodiments.

FIG. 18 shows an example of the octree generation S17010-1 of FIG. 17.

The method/device according to the embodiments may determine the order of nodes 18000 included in a bounding box. The regions of octree sub-nodes and the order thereof in the tree may be basically determined as follows: the bottom left front 1 may be determined as a first child node; the bottom left back 2 may be determined as a second child node; the top left front 3 may be determined as a third child node; the top left back 4 may be determined as a fourth child node; the bottom right front 5 may be determined as a fifth child node; the bottom right back 6 may be determined as a sixth child node; the top right front 7 may be determined as a seventh child node; the top right back 8 may be determined as the last child node.

The method/device according to the embodiments may sort the eight nodes included in a bounding box and represent the same as an octree 18010. The octree shows that the eight nodes are included in one parent node 18020.

The method/device according to the embodiments may be applied by changing the order of 1 to 8, and information about the order may be included in a bitstream as signaling information and transmitted to the reception method/device according to the embodiments. For example, when points are more predominantly arranged on the right side in the bounding box or space, and/or when it is desired to shorten the delay time by partitioning the right part first and performing encoding, the order may be changed. The improved slice partitioning may eliminate the need to additionally perform a split/merge operation with a separate neighbor slice. Accordingly, the slice may be efficiently compressed as soon as it is partitioned.

Figure 19:
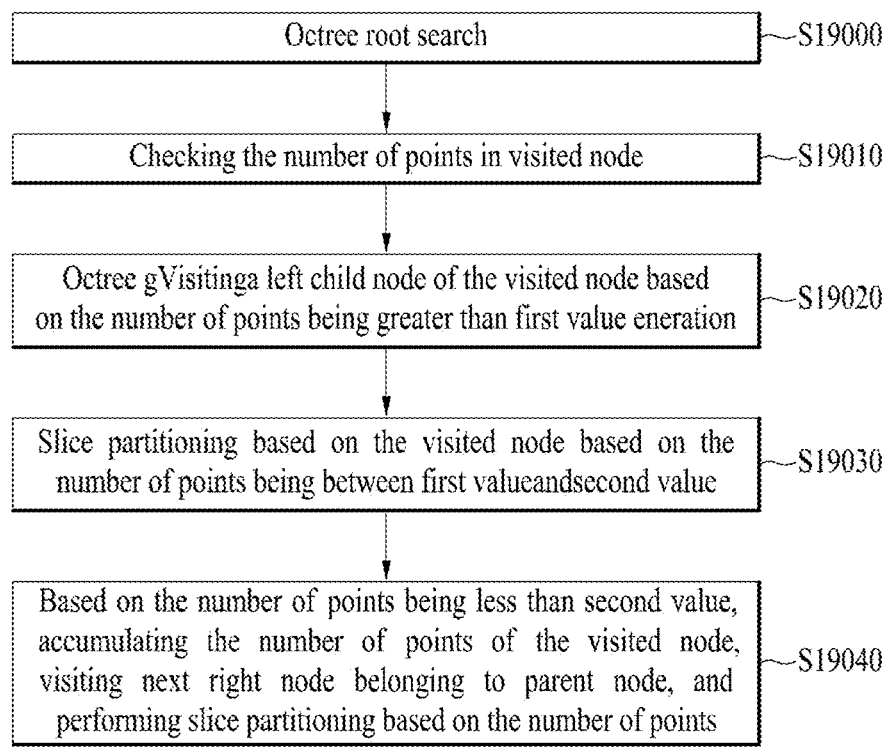
FIG. 19 illustrates slice partitioning according to embodiments.

FIG. 19 illustrates slice partitioning according to embodiments.

FIG. 19 shows the slice partitioning S17010-2 of FIG. 17 in more detail.

The method/device according to the embodiments may perform a combination including at least one of the following operations.

S19000 Octree Root Search

The method/device according to the embodiments may visit the node(s) included in the octree for slice partitioning.

The octree search (or node visit order) according to the embodiments may follow an order starting from the root node of the octree. Regarding the visit order, the next nodes may be visited based on the pre-order traverse order, starting from the root node of the octree.

In the pre-order traverse according to the embodiments, the root (or the parent node) is visited first. Then, among the child nodes belonging to the parent mode, a left sub-tree and a right sub-tree are visited in order In addition, depending on whether a condition according to embodiments is satisfied, the sub-node visit may be omitted and a sibling node or the next right sub-tree of the parent node may be visited.

The order of node visits will be described with reference to FIG. 20.

S19010 Checking the Number of Points in a Visited Node

The method/device according to the embodiments may visit a node of an octree in an order according to the embodiments, and check the number of points based on the visited node.

For example, when the number of points included in the first node of the octree is a, it means that the number of points on a leaf node connected to the first node is a. In other words, it means that the number of points to be subjected to point cloud encoding and decoding may be a.

Accordingly, the points of the octree may be partitioned into slices having an efficient number of points, based on the visit order according to the embodiments, for efficient point cloud encoding and decoding.

S19020 Visiting a Left Child Node of the Visited Node Based on the Number of Points being Greater than a First Value.

Based on the currently visited node, when the number of points included in the node(s) is greater than r1 (a first value constituting the range according to the embodiments) according to the embodiments, the method/device according to the embodiments may visit left child nodes of the current node in pre-order order.

An example of visiting the left child nodes of the current node will be described with reference to FIG. 21.

S19030 Slice Partitioning Based on the Visited Node Based on the Number of Points being within the Range of the First Value to the Second Value When the number of points included in a node with respect to the currently visited node is r0 to r1 according to the embodiments (where r0 and r1 are the first and second values constituting the range according to the embodiments, respectively), the method/device according to the embodiments may separate the points into one slice based on the visited node. The slice may be generated from a node with an appropriate number of points. For the slice-partitioned node, the points on the leaf nodes connected to the node are included in the slice, and therefore the sub-child nodes of the node do not need to be further visited. Visiting sub-nodes of the slice-partitioned node may be omitted.

The method/device according to embodiments may visit another right node of the parent mode to which the slice-partitioned node belongs.

The range value according to the embodiments may be represented as a first value, a second value, and the like.

Slice partitioning and subsequent operations will be described with reference to FIG. 22.

S19040 Based on the Number of Points being Less than the Second Value, Accumulating the Number of Points of the Visited Node, Visiting the Next Right Node Belonging to the Parent Node, and Performing Slice Partitioning Based on the Number of Points When the number of points included in the currently visited node is less than r0 (the first value) according to the embodiments, the method/device according to the embodiments may register the points of the visited node in a newly generated slice. In addition, as the number of points is small, sub-child nodes of a node allocated to the new slice may not be visited. An octree represents the inclusion relationship of points through a parent node and child nodes. Assigning the points of the parent node to a slice means that sub-nodes do not need to be searched because the points of the child nodes of the node belong to the parent node. Then, the next right node of the parent node of the node may be visited. Since the node visit is performed due to the small number of points allocated to the slice, the number of points may be calculated by accumulated the number of points of the registered node. Slice partitioning may be performed by visiting nodes until the accumulated number of points is included in the range according to embodiments.

Node visits and slice partitioning performed when the number of points is small will be described with reference to FIG. 23.

A method of transmitting point cloud data according to embodiments may include encoding point cloud data; and transmitting a bitstream including the point cloud data.

The encoding according to the embodiments may include quantizing geometry data of the point cloud data.

The encoding may further include partitioning the point cloud data into slices based on an octree.

The encoding may further include generating an octree from geometry data of the point cloud data.

The encoding may further include visiting a node of the octree generated from the geometry data of the point cloud data and checking the number of points included in the node.

When the number of points included in the node is greater than a first value, slice partitioning may be performed by visiting a left child node of the node. A node with an appropriate number of points may be searched for and the next node may be visited.

When the number of points included in the node according to the embodiments is within the range of the first value and a second value, the slice may be partitioned based on the node.

When the number of points included in the node is less than the second value, a right node belonging to the parent node of the node may be visited. A node with an appropriate number of points may be searched for and the next node may be visited.

Figure 20:
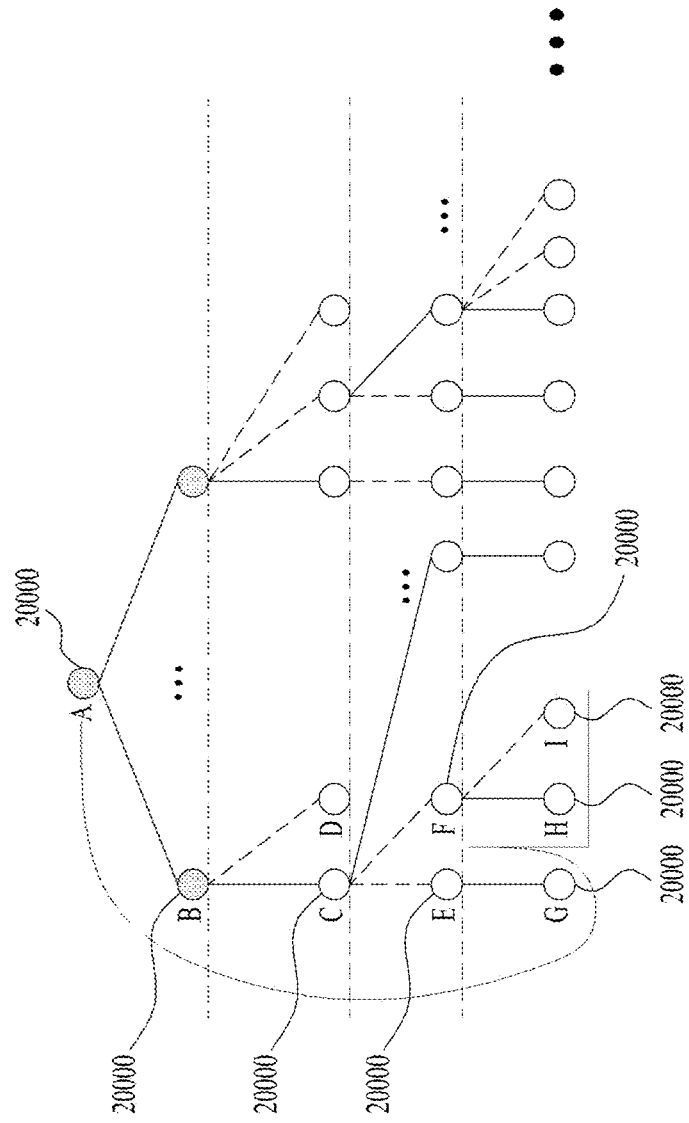
FIG. 20 illustrates a node visit order in an octree according to embodiments.

FIG. 20 illustrates a node visit order in an octree according to embodiments.

FIG. 20 shows an example of the pre-order traverse visit of FIG. 19.

For example, given a graph (or octree) as shown in FIG. 20, the method/device according to the embodiments may first visit node A 20000, which is the root, and then visit nodes in order of node B 20000→node C 20000→node E 20000→node G 20000→node F 20000→node H 20000→node I 20000.

According to embodiments, when the number of nodes (the number of points included in a node) satisfies an appropriate number in comparison during a visit process, a visit to the next sub-node from the current node may be omitted, and a sibling node and/or a parent node of the current node may be visited to perform a search.

Figure 21:
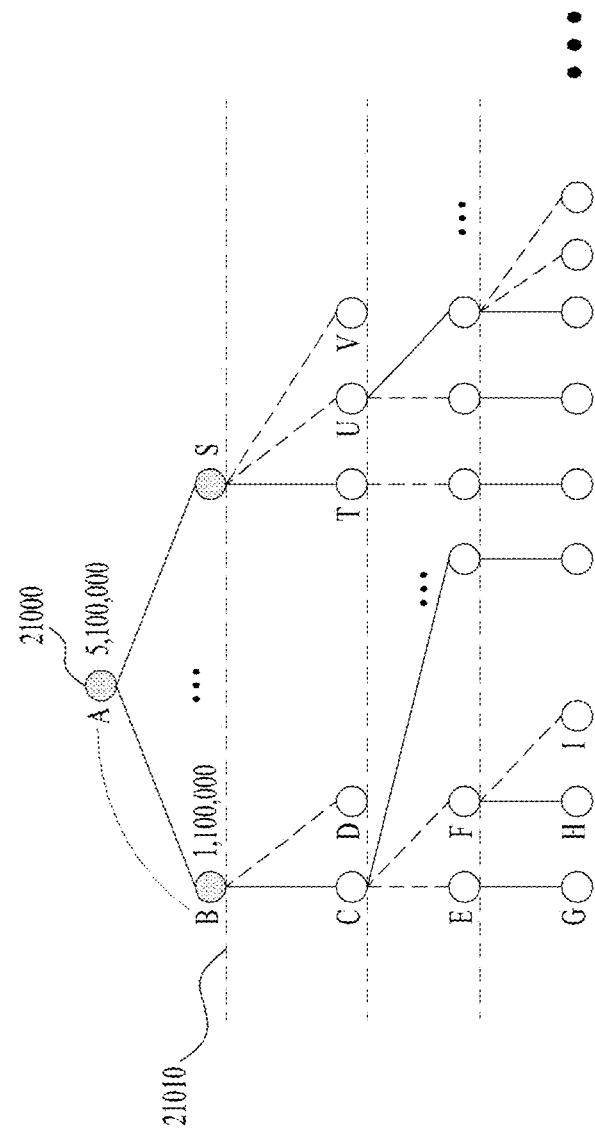
FIG. 21 illustrates a node visit order based on the number of points according to embodiments.

FIG. 21 illustrates a node visit order based on the number of points according to embodiments.

FIG. 21 illustrates an operation of checking the number of points in FIG. 19 and determining a visit order according to the number.

For example, when the method/device according to the embodiments visits nodes in the octree as shown in FIG. 21, node A 21000, which is the root, is visited first, and the number of points in node A is 5,100,000 greater than greater than r1 (e.g., r1=1,100,500). Accordingly, the left child node B 21010 among the sub-nodes is visited. Points included in node A represent points included in node A and nodes belonging to node A. That is, the number of points on the leaf nodes connected to node A is 5,100,000. Since the number of points related to node A is greater than a reference value (r1) according to the embodiments, more detailed partitioning is required. Thus, it may be important to determine the order of node visits for partitioning.

Figure 22:
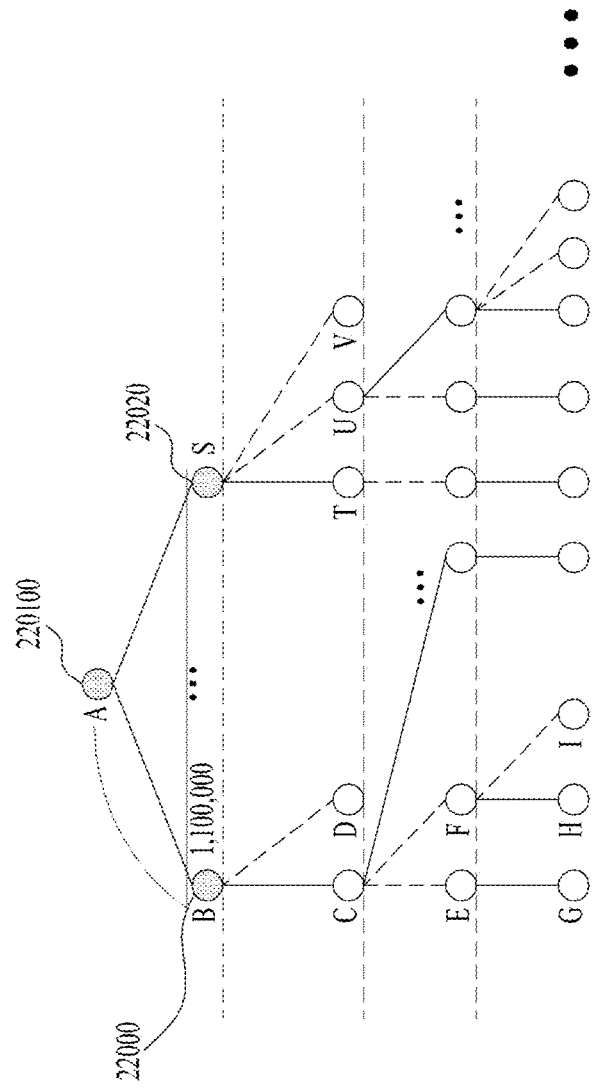
FIG. 22 shows execution of slice partitioning operation and a next visit according to embodiments.

FIG. 22 illustrates execution of slice partitioning operation and a next visit according to embodiments.

FIG. 22 illustrates an example of slice partitioning for a node having an appropriate number of points in FIG. 19 and an order of visits to next nodes after slice partitioning.

For example, in the octree (graph) as shown in FIG. 22, the method/device according to the embodiments visits node B 22000. Since the number of points in node B 22000 is 1,100,000, which is between r0 (the first value) and r1 (the second value), one slice may be configured with all points belonging to the node 22000. In other words, a first slice of points of a leaf node connected to the node 22000 may be configured through slice partitioning. Then, for the next visits, visits to the child nodes of node B 22000 may be omitted (the visit to the sub-nodes is not necessary because the slice partitioning has been completed), and node S 22010, which is the next right node of the parent node A 22020, may be visited according to the pre-order.

Figure 23:
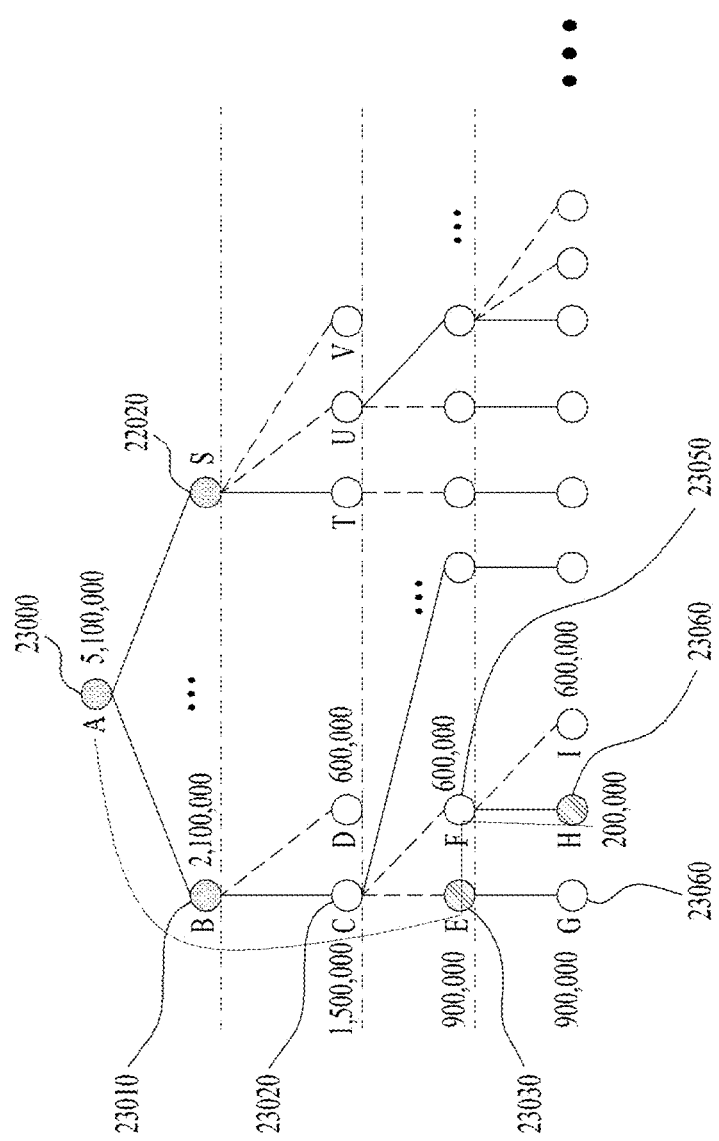
FIG. 23 illustrates node visits and slice partitioning according to the number of points according to embodiments.

FIG. 23 illustrates node visits and slice partitioning according to the number of points according to embodiments.

FIG. 23 illustrates an example of the order of visits to the next nodes and slice partitioning when the number of points of the node visited by the method/device according to the embodiments in FIG. 19 is less than a range value according to the embodiments.

For example, in the octree (which may be referred to as a graph) as shown in FIG. 23, for node A 23000, the number is greater than r1, and thus node B 23010 is visited. Since the number is still greater than r1 for node B 23010, node C 23020 may be visited. Since the number is still greater than r1 for node C 23020, node E 23030 may be visited. For node E 23030, the number is 900,000 which is less than r0. Node E 23030 may be registered in a new slice (which may be referred to as a first slice, a second slice, or the like), and the number of points may be accumulated to be 900,000.

Visiting child nodes (e.g., node G 23040) may be omitted and node F 23050, which is the next right node of the parent node 23020, may be visited.

The sum of the cumulative number of registered nodes (900,000) and the number of points in F (600,000) is 1,500,000 (=900,000+600,000), which is greater than r1 (r1=1,100,500). Accordingly, child node H 23060 may be visited.

The cumulative number in node H node 23060 is 1,100,00 (=900,000 in node E 23030+200,000 in node H 23060). Since this value is within the range of r0 to r1 according to the embodiments, the registered node (node E 23030) and the current node (node H 23060) are combined to generate one slice (which may be referred to as a slice, a second slice, or the like).

Accordingly, the method/device according to the embodiments may generate a slice including the points belonging to node E 23030 and node H 23060. That is, the points of the leaf nodes belonging to node E 23030 and node H 23060 may be configured as one slice.

Based on the slice(s) generated as described above, the point cloud data according to embodiments may be efficiently encoded and/or decoded.

As described with reference to FIGS. 17 to 23, octree-based slice partitioning may be performed according to embodiments.

In this operation, there is no need to re-run unnecessary slice partitioning. In addition, there is no need to proceed with the operation of splitting and merging data. As a result, the time taken to execute slice partitioning may be effectively shortened.

In addition, the partitioned slices may maintain the ideal (optimized) number of points, and the decoded points, which is a condition for a slice, may not be duplicated in the decoder.

The slice partitioning according to the embodiments may quickly generate a slice composed of the number of points optimized for encoding/decoding while efficiently visiting a node based on an octree. Further, the occurrence of duplicated points, which may increase complexity, may be prevented in generating a slice.

The operations of the embodiments have been described by way of example. The embodiments are intended to include changes/modifications within the scope intended by the embodiments, without limiting the operations of the embodiments by example terms and/or order.

Figure 24:
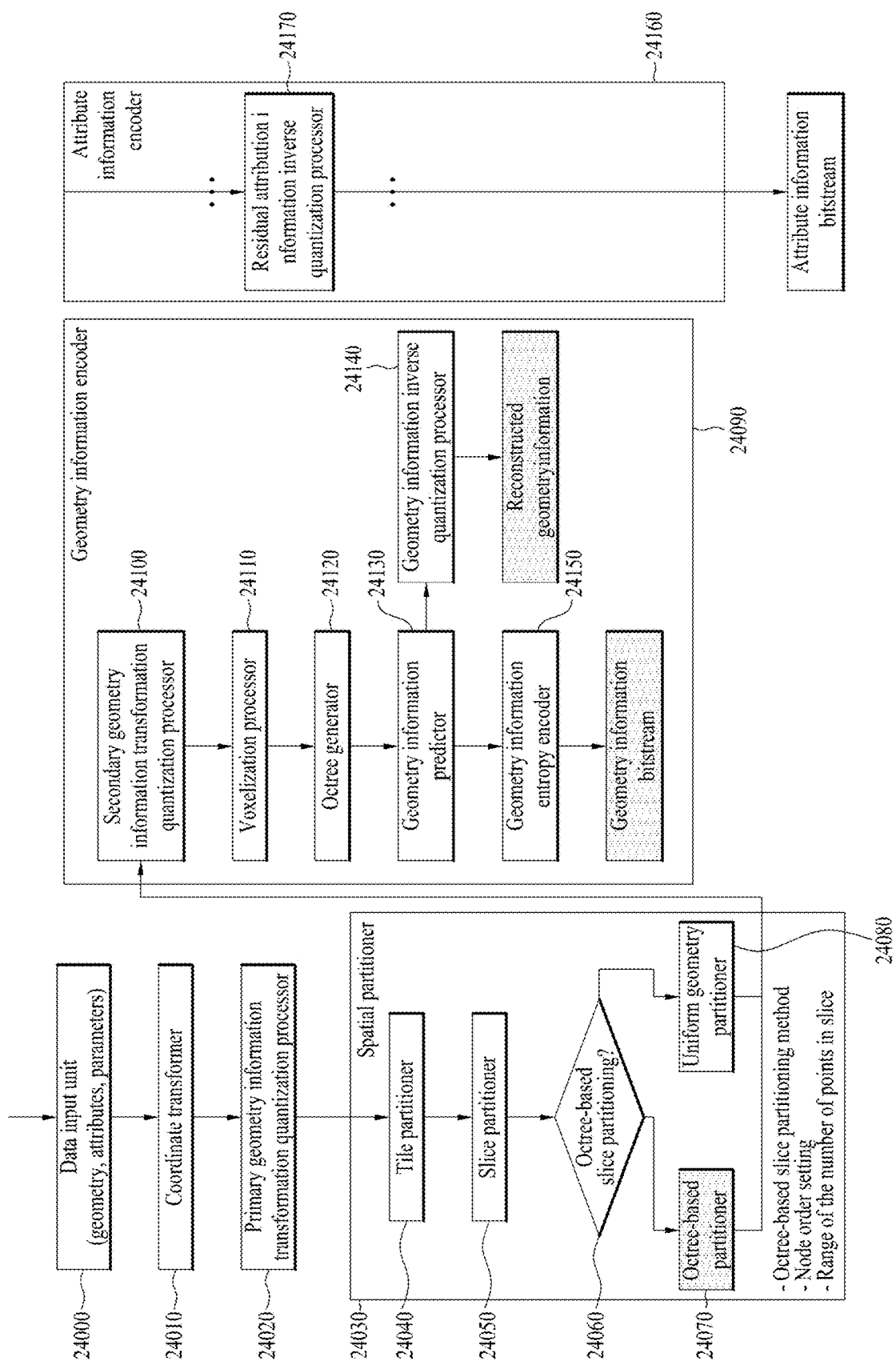
FIG. 24 illustrates a PCC data encoder according to embodiments.

FIG. 24 illustrates a PCC data encoder according to embodiments.

FIG. 24 may correspond to or be combined with the transmission device 10000 of FIG. 1, the point cloud video encoder 10002 of FIG. 1, the encoding 20001 of FIG. 2, the encoder of FIG. 4, the transmission device of FIG. 12, the XR device 1430 of FIG. 14, and the like. The encoder of FIG. 24 and the transmission device or encoder corresponding to FIG. 24 may perform encoding based on the partitioning of FIGS. 15, 17, 19, and the like. Each component in FIG. 24 may correspond to hardware, software, a processor, and/or a combination thereof.

FIG. 24 is a block diagram of a PCC data encoder. An encoder and an encoding device are referred to as an encoder, and a decoder and a decoding device are referred to as a decoder. PCC data may be input to and encoded by the encoder, and a geometry information bitstream and an attribute information bitstream may be output.

FIG. 24 is an example block diagram of the PCC data encoder. The PCC data encoder according to the embodiments may include at least one combination of the following components, and may further include components not shown in FIG. 24.

A data input device 24000 may receive geometry information, which is position information indicating an object of point cloud content, attribute information such as color, and parameter information for the same. The data input device may receive geometry data, attribute data, and/or parameters related thereto.

A coordinate transformer 24010 may transform a coordinate system related to position (coordinate) information about the geometry data. The coordinate transformer 24010 may correspond to the coordinate transformer 40000 of FIG. 4.

A primary geometry information transformation quantization processor 24020 may be referred to as a geometry information transformation quantizer or the like. The geometry information transformation quantization processor 24020 may correspond to the quantizer 40001 of FIG. 4. The geometry information transformation quantization processor 24020 may quantize the point cloud data based on a quantization value.

A spatial partitioner 24030 may partition the point cloud data into spatial partition units according to embodiments. The spatial partitioner 24030 may space-adaptively partition the space of data using a method such as tile-based partitioning, block-based partitioning, density-based partitioning, axis-based partitioning, attribute-based partitioning, or geometry-based partitioning according to the data characteristics of the point cloud data. The spatial partitioner 24030 may perform data partitioning. A frame may be partitioned into tiles and/or slices according to embodiments. The source point cloud data may be partitioned into multiple slices and may be encoded in a bitstream. A slice is a set of points that may be independently encoded or decoded. A slice may contain one geometry data unit and zero or one or more attribute data units. The attribute data units may depend on corresponding geometry data in the same slice. In a slice, a geometry data unit may appear before related attribute units. The data units of a slice are contiguous. A group of slices may be identified by a common tile identifier. Tile information describing a bounding box for each tile may be in the bitstream. A tile may overlap another tile in the bounding box. Each slice may include an index for identifying a tile to which it belongs.

The spatial partitioner 24030 may include the following components.

A tile partitioner 24040 may partition point cloud data based on tiles. For efficient encoding and/or decoding of the point cloud data, the data may be partitioned and processed for each tile according to space.

A slice partitioner 24050 may partition the point cloud data based on slices. For efficient encoding and/or decoding of the point cloud data, the data may be partitioned and processed for each slice. The slice partitioner 24050 may perform efficient slice partitioning operations (see FIGS. 17 to 23).

The slice partitioner 24050 may perform an octree-based partition operation or a uniform geometry partition operation according to whether octree-based slice partitioning is performed, and may transmit information about a slice partition type in a bitstream (see FIG. 26).

An octree-based partitioner 24060 may partition the point cloud data into one or more slices based on the octree. The octree-based partitioner 24060 may efficiently generate a slice containing an appropriate number of points. Values related to the octree-based slice partitioning type, the order of designation of nodes in generating an octree (see FIG. 18), the range of the number of points in a slice, and the like may be determined from the system or may be input by the user and set. These values may be transmitted in the bitstream as signaling information (see FIG. 26). The reception method/device according to the embodiments may acquire an octree-based slice based on the signaling information included in the bitstream and reconstruct the point cloud data.

The transmission method/device according to the embodiments may receive a slice partitioning method from a user and/or system configuration. An octree-based or uniform geometry technique is available. The partitioning method may be signaled to the decoder (it may be transmitted in the bitstream as signaling information (see FIG. 26)). When octree-based partitioning is used, a level-by-level scheme may be used or an enhanced version may be used (see FIGS. 15 and 17 to 23). Which technique to use may be input from the user and/or system configuration, and the method used in the decoder may be signaled as a slice partitioning method (transmitted in the bitstream as signaling information (see FIG. 26)). The reception method/device according to the embodiments may acquire an octree-based slice based on the signaling information included in the bitstream and reconstruct the point cloud data.

According to embodiments, an ideal range of the number of points in a slice may be set to r0 to r1 (=1,100,000∓α), and these range values, the range adjustment value (α), and the like may be received as input from a user and/or system configuration. In some embodiments, default values may be 1,100,000∓500. It may be signaled to the decoder. Parallel processing may be adjusted in consideration of the processing capability of the decoder according to the number of points in the decoded slice.

When improved octree-based partitioning is used according to embodiments, an order of octree child nodes according to regions (from left to right) may be received as input from a user and/or system configuration. Since the order according to regions is linked to the traverse order in the octree, slices may be generated first. Accordingly, the order may be specified for regions requiring low latency. This ordering method may be signaled to the decoder (transmitted in a bitstream as signaling information (see FIG. 26)). Also, the reception method/device according to the embodiments may acquire an octree-based slice based on the signaling information included in the bitstream, and reconstruct the point cloud data based on the slice.

When the improved octree-based partitioning according to the embodiments is used, slice partitioning may be performed as shown in FIGS. 17 to 23.

The block diagram of FIG. 24 is merely an example, and the relationship between components in configuration may be changed according to embodiments. That is, the spatial partitioner 24030 may be included in the geometry information encoder 24090.

The uniform geometry partitioner 24070 may uniformly partition the geometry. For example, it may uniformly partition data based on sequentially input point cloud data.

The uniform geometry partitioner 24070 does not partition the geometry based on the octree.

Based on the length of the shortest axis based on the size of the bounding box of content, the uniform geometry partitioner 24070 partitions other axes into equal sizes. Slices are generated through such partitioning. Additionally, when a slice generated in the merging operation fails to satisfy the slice condition, it may be merged with a neighbor slice or may be split.

The geometry information encoder 24080 may encode the geometry data of the point cloud data. The details of the geometry encoding are configured as follows.

A secondary geometry information transformation quantization processor 24090 may voxelize the geometry data. Quantization related to the voxelizer 40001 of FIG. 4 may be performed.

As shown in FIG. 24, the quantizer or quantization operation may be divided into two parts in the PCC encoder or encoding operation: primary geometry quantization and secondary geometry quantization. Here, the primary geometry information quantizer may quantize the point cloud data by applying a scale value. The secondary geometry information quantizer may perform a voxelization operation of representing the point cloud data as voxels. That is, the quantization operation(s) according to the embodiments may be performed in variously ways.

A voxelization processor 24100 may voxelize the geometry data. The secondary geometry transformation quantization processor 24090 may perform quantization for voxelization, and the voxelization processor 24100 may voxelize the geometry data (see FIG. 5).

An octree generator 24110 may generate geometry data in an octree structure. The octree generator 24110 may correspond to the octree analyzer 40002 of FIG. 4 (see FIG. 6).

When a geometry octree is used, geometry encoding may be performed as follows: A bounding box defined by two points may be defined. An octree structure is built by recursively subdividing the bounding box. Each cube is divided into 8 sub-cubes. The 8-bit code may be referred to as an occupancy code. For each sub-cube, 1 bit may be represented as 1 when the point is occupied, and 0 when the point is empty. Sub-cubes with a dimension greater than 1 are further divided. A sub-cube whose dimension is 1 may be a voxel. Multiple points may be duplicated and may be mapped to the same sub-cube (voxel). The points of each sub-cube may be arithmetically encoded.

The decoding process may be started by reading the dimensions of the bounding box from the bitstream. The same octree structure may be created by dividing the bounding box according to the occupancy codes. When the sub-cube of dimension 1 is reached, points of the sub-cube may be arithmetically decoded.

The octree generator 24110 constructs an octree from the received geometry information bitstream (geometry data).

A geometry information predictor 24120 may predict geometry data. The geometry information predictor 24120 may generate a predicted value of the geometry data between a parent node and a child node in the octree structure. A geometry bitstream may be configured by generating a residual through the predicted value and entropy-coding the residual. By coding only the residual with respect to the predicted value, efficient bitstream transmission may be implemented. The geometry predictor 24120 may reconstruct geometry data from a geometry octree to perform attribute coding. This is because attribute coding is performed based on the reconstructed geometry data.

A geometry information inverse quantization processor 24130 may inversely quantize the geometry data. Reconstructed geometry information may be generated by inversely quantizing the quantized geometry data. This is because the reconstructed geometry information may be required for attribute information encoding.

A geometry entropy encoder 24140 may entropy-code the geometry data to generate a geometry bitstream.

An attribute information encoder 24150 may encode attribute data.

For example, for attribute information encoding, a color transform processor configured to transform the color of attribute data according to the data characteristics, color recoloring of re-applying a color (attribute information, representative color) to geometry data, an LOD generator configured to configure point cloud data for predictive coding as levels of detail (LODs), an attribute information predictor configured to generate a predicted value for generation of a residual between points, a residual attribute information quantization processor 24160 configured to generate and quantize a residual from a predicted value for a point, and a residual attribution information entropy coder configured to entropy-code the quantized residual attribution information, not shown in the figure, may be further included as components of the attribution information encoder.

The PCC encoder (corresponding to the transmission method/device, encoder, or the like according to the embodiments) may generate and transmit a point cloud bitstream including the encoded geometry data and the encoded attribute data as described above (see FIGS. 26 to 28).

A point cloud data transmission device according to embodiments may include an encoder configured to encode point cloud data, and a transmitter configured to transmit a bitstream including the point cloud data.

According to embodiments, the encoder may include a quantizer configured to quantize geometry data of the point cloud data.

The encoder may include a partitioner configured to partition the point cloud data into slices based on an octree.

The partitioner may generate an octree from the geometry data of the point cloud data.

The partitioner may visit a node of the octree generated from the geometry data of the point cloud data and check the number of points included in the node.

When the number of points included in the node is greater than a first value (a value constituting a range according to embodiments), a left child node of the node may be visited.

When the number of points included in the node is between the first value and a second value (values constituting a range according to embodiments), a slice may be partitioned based on the node.

When the number of points included in the node is less than the second value, a right node belonging to the parent node of the node may be visited.

FIG. 25 illustrates a PCC decoder according to embodiments.

FIG. 25 may correspond to or be combined with the reception device 10004 of FIG. 1, the point cloud video decoder 140006 of FIG. 1, the decoding 20003 of FIG. 2, the decoder of FIG. 10, the decoder of FIG. 11, the reception device of FIG. 13, and the XR device 1430 of FIG. 14, and the like. The configuration of FIG. 25 and the reception device or decoder corresponding to FIG. 25 may perform decoding based on the partitioning of FIGS. 15, 17, 19, and the like. FIG. 25 shows the components of the reception device corresponding to FIG. 24. The operation of each component in FIG. 25 may follow the reverse process of the operation of each corresponding component in FIG. 24. Similarly to FIG. 24, each component in FIG. 25 may correspond to hardware, software, a processor, and/or a combination thereof.

FIG. 25 is an example block diagram of a PCC data decoder. THE PCC data decoder according to THE embodiments may include at least one combination of the following components, and may further include components not shown in FIG. 25.

The encoded geometry information bitstream and attribute information bitstream may be input to and decoded by the decoder, and the decoded and reconstructed PCC data may be output.

The block diagram of FIG. 25 is merely an example, and the relationship between the components in configuration may be changed according to embodiments. That is, the spatial partitioner 25000 and the geometry information entropy decoder 25010 may be included in the geometry information decoder 25030.

In a positional relationship, the spatial partitioner 25000 may be connected before the geometry information decoder 25030, may be included in the geometry information decoder 25030, or may be connected after the geometry information decoder 25030.

A space reconstructor 25000 may receive point cloud data. The space reconstructor 25000 may receive a geometry information bitstream of a bitstream including the point cloud data. The space reconstructor 25000 may reconstruct a space related to geometry data for encoding of the point cloud data. The space reconstructor 25000 may perform a reverse process of the operation of the spatial partitioner 24030 of the transmitting side. The space reconstructor 25000 may reconstruct the space of the geometry data based on an octree-based slice partitioning method, a node order setting value, a range related to the number of points in a slice, and the like. Information related to the octree-based slice partitioning method, the node order setting value, and the range related to the number of points in a slice, and/or an option configuration method for space reconstruction may be received and acquired by parameters included in the bitstream (FIGS. 26 to 28).

The space reconstructor 25000 may select a priority from among multiple slices based on signaling information related to spatial partitioning. That is, the space may be reconstructed in order to efficiently decode the slices. The space reconstructor 25000 may receive the geometry data and provide slices input to the decoder in order. The space reconstructor 25000 may provide data to the decoder such that the geometry data may be processed at a specific level first. The space reconstructor 25000 may provide data to the decoder by setting an order of nodes in the geometry data.

The space reconstructor 25000 may reconstruct a space based on a range of the number of points in a slice used for reconstructed slice partitioning. In addition, efficient parallel processing may be adjusted in consideration of the processing capability of the decoder.

The space reconstructor 25000 may reconstruct the space based on the reconstructed octree node order set value. The priority or reconstruction priority may be adjusted in space reconstruction.

The space reconstructor 25000 may reconstruct a space based on tile/slice information.

The space reconstructor 25000 may reconstruct one point cloud by integrating the reconstructed points into one.

The geometry information entropy decoder 25010 may receive the geometry information bitstream and decode the geometry information based on an entropy scheme. The geometry information entropy decoder 25000 may perform a reverse process of the operation of the geometry information entropy encoder 24150.

The geometry information decoder 25020 may receive the geometry information bitstream and decode the geometry information. The geometry information decoder 25000 may correspond to a decoder of the receiving side corresponding to the geometry information encoder 24090 of the transmitting side. The geometry information decoder 25000 may perform a reverse process of the operation of the geometry information encoder 24090.

The octree reconstructor 25030 may reconstruct an octree from geometry information. The octree reconstructor 25000 may perform a reverse process of the operation of the octree generator 24120.

The geometry information predictor 25040 may generate a predicted value of the geometry information. For example, in the octree structure, an inter-node predicted value may be generated, and the geometry information may be efficiently decoded using a residual with respect to the predicted value. The geometry information predictor 25040 may perform a reverse process of the operation of the geometry information predictor 24130. The reconstructed geometry information may be provided to an attribute information encoder 25070.

A geometry information transformation inverse quantization processor 25050 may inversely quantize the geometry data. For example, the geometry information transformation inverse quantization processor 25050 may acquire a scale value (quantization value) from the signaling information (parameter) included in the bitstream, and apply inverse quantization to the geometry information reconstructed based on the scale value.

The geometry information transformation inverse quantization processor 25050 may inversely quantize the geometry information based on information about each tile/slice/block. Such information may include, for example, a geometry quantization parameter (QP).

A coordinate inverse transformer 25060 may inversely transform coordinate information of the geometry information. The coordinate inverse transformer 25000 may perform a reverse process of the operation of the coordinate transformer 24010.

The attribute information decoder 25070 may receive the attribute information bitstream and decode the attribute information. The attribute information decoder 25000 may perform a reverse process of the operation of the attribution information encoder 24160.

A residual attribute information inverse quantization processor 25080 may inversely quantize attribute residual information (e.g., a residual for the attribute information) included in the attribute information bitstream.

The residual attribution information inverse quantization processor 25000 may inversely quantize the residual attribution information based on an information value for each block. Such information may include, for example, an attribute quantization parameter (QP).

Although not shown in FIG. 25, the attribute information decoder 25000 may further include a residual attribute information entropy decoder configured to decode attribute residual information (e.g., a residual for the attribute information) included in the attribute information bitstream based on the entropy scheme, an LOD configurator configured to configure an LOD from point cloud data for predictive coding, a neighbor point set configurator configured to search for neighbors of a point included in LODs based on the LOD generated from the attribute information bitstream and register the same as a neighbor point set, an attribute information predictor configured to generate a predicted value for the attribute information, and an color inverse transformation processor configured to inversely transform color information corresponding to the attribute information.

The space reconstructor 25090 according to the embodiments is the same as the space reconstructor 25000. A position where the space reconstructor according to the embodiments is included or an operation thereof is performed may be changed according to embodiments. The space reconstructor 25090 may acquire an octree-based slice partitioning method and/or a node order setting value from a bitstream, and reconstruct point cloud data through the same.

A point cloud data reception device according to embodiments may include a receiver configured to receive a bitstream including point cloud data, and a decoder configured to decode the point cloud data.

The decoder may reconstruct a slice based on the octree of the point cloud data based on the information included in the bitstream (FIGS. 26 to 28).

FIG. 26 shows the configuration of a bitstream including point cloud data according to embodiments.

The method/device according to the embodiments may generate and acquire a point cloud bitstream as shown in FIG. 26. For example, a point cloud bitstream including geometry information, attribute information, and/or parameters including metadata for the same may be generated (encoded) and received (decoded) by the transmission device 10000, the point cloud video encoder 10002, the reception device 10004, the point cloud video decoder 10006 of FIG. 1, the encoding 20001, the decoding 20003 of FIG. 2, the encoding process of FIG. 4, the decoding process of FIG. 11, the transmission device of FIG. 12, the reception device of FIG. 13, the XR device 1430 of FIG. 14, the encoder of FIG. 16, the encoder of FIG. 24, the decoder of FIG. 25, and the like, respectively.

Information for embodiments may be signaled.

The following abbreviations are used in the present disclosure: SPS (Sequence Parameter Set); GPS (Geometry Parameter Set); APS (Attribute Parameter Set); TPS (Tile Parameter Set); Geom (Geometry bitstream (=geometry slice header+geometry slice data)); Attr (Attribute bitstream (=attribute brick header+attribute brick data)). Here, the brick may be referred to as a block, a slice, or the like.

The point cloud data according to the embodiments may take the form of a bitstream as shown in FIG. 26. The point cloud data may contain a sequence parameter set (SPS), a geometry parameter set (GPS), an attribute parameter set (APS), and a tile parameter set (TPS) containing signaling information according to embodiments. The point cloud data may contain one or more geometries and/or attributes. The geometry and/or attributes in the point cloud data may be divided into one or more slices (or bricks/blocks). The geometry may have a structure of a geometry slice header and geometry slice data. For example, the TPS containing signaling information may include Tile(0)_tile_bounding_box_xyz0 and Tile(0)_tile_bounding_box_whd. The geometry may include geom_geom_parameter_set_id, geom_tile_id, geom_slice_id, geomBoxOrigin, geom_box_log 2_scale, geom_max_node_size_log 2, and geom_num_points.

The signaling information according to the embodiments may be added to the SPS, GPS, APS, TPS, or the like and signaled.

According to embodiments, the signaling information may be added to the TPS, the Geom for each slice, or the Attr for each slice and signaled.

The structure of the point cloud data according to the embodiments may efficiently provide parameter set(s), geometry(s), and attribute(s) including signaling information in terms of encoding/decoding/data.

The point cloud data related to the point cloud data transmission/reception device according to the embodiments may contain at least one of a sequence parameter, a geometry parameter, an attribute parameter, a tile parameter, a geometry bitstream, or an attribute bitstream.

Hereinafter, syntax of specific signaling information will be described with reference to the drawings. For reference, the name of the signaling information according to the embodiments may be changed/extended within the intended meaning/function range of the signaling information. The field of signaling information may be distinguishably referred to as first signaling information, second signaling information, or the like.

As described above, the point cloud data transmission device (for example, the point cloud data transmission device described with reference to FIGS. 1, 11, 14 and 1) may transmit encoded point cloud data in the form of a bitstream. According to embodiments, the bitstream may include one or more sub-bitstreams.

The point cloud data transmission device (e.g., the point cloud data transmission device described in FIGS. 1, 4, 12 and 16) may divide an image of the point cloud data into one or more packets in consideration of the error of the transmission channel, and transmit the same over the network. According to embodiments, the bitstream may include one or more packets (e.g., network abstraction layer (NAL) units). Therefore, even when some packets are lost in a poor network environment, the point cloud data reception device may reconstruct the image using the remaining packets. The point cloud data may be partitioned into one or more slices or one or more tiles to be processed. The tiles and slices according to embodiments are regions for performing point cloud compression coding by partitioning a picture of the point cloud data. The point cloud data transmission device may provide high-quality point cloud content by processing data corresponding to each region according to the importance of each partitioned region of the point cloud data. That is, the point cloud data transmission device may perform point cloud compression coding with better compression efficiency and appropriate latency on data corresponding to a region important to a user.

An image (or picture) of point cloud content according to embodiments is partitioned into basic processing units for point cloud compression coding. The basic processing unit for point cloud compression coding according to the embodiments may include, but is not limited to, a coding tree unit (CTU) and a brick (=slice).

A slice according to embodiments is a region including basic processing units for one or more point cloud compression codings, and does not have a rectangular shape. The slice according to the embodiments contains data transmitted through a packet. A tile according to embodiments is a region partitioned in a rectangular shape in the image and includes basic processing units for one or more point cloud compression codings. One slice according to embodiments may be included in one or more tiles. Also, one tile according to embodiments may be included in one or more slices.

According to embodiments, a bitstream may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and one or more slices.

The SPS according to the embodiments may be encoding information for an entire sequence such as a profile and a level, and may include comprehensive information about the entire file, such as picture resolution and video format.

One slice according to embodiments (e.g., slice 0) contains a slice header and slice data. The slice data may include one geometry bitstream Geom00 and one or more attribute bitstreams Attr00 and Attr10. The geometry bitstream may contain a header (e.g. geometry slice header) and a payload (e.g. geometry slice data). The header of the geometry bitstream according to the embodiments may contain identification information (geom_geom_parameter_set_id) about a parameter set included in the GPS, a tile identifier (geom_tile_id), slice identifier (geom_slice_id), origin information about a geometry box (geomBoxOrigin), a geometry box scale (geom_box_log 2_scale), a max geometry node size (geom_max_node_size_log 2), the number of geometry points (geom_num_poins), and information about data contained in the payload. The attribute bitstream may contain a header (e.g. an attribute slice header or an attribute brick header) and a payload (e.g., attribute slice data or attribute brick data).

The method/device according to the embodiments may add, to the SPS, geometry quantization option information according to the embodiments in the point cloud bitstream to the SPS and signal the same. The geometry quantization option information for each axis according to the embodiments may be added to the GPS and signaled. The SPS may maintain the scale value (quantization value) applied as a whole, and the GPS may set a scale value (quantization value) which is fine-tuned.

Parameter information related to embodiments may be delivered to various regions (units) such as a sequence, geometry, attribute, a tile, and a slice, and the reception method/device according to the embodiments may statically/dynamically access point cloud data.

Related information may be signaled to implement embodiments. Signaling information according to embodiments may be used at the transmitting side or the receiving side.

Geometry data (Geom): Geometry bitstream=geometry slice header+geometry slice data Attribute data (Attr): Attribute bitstream=attribute slice header+attribute brick data.

In dividing the point cloud data into regions, an option of generating a different neighbor point set for each region may be configured, such that low complexity is obtained although the reliability of the result is somewhat low, or that high reliability is obtained although the complexity is high. In may be configured differently according to the processing capacity of the receiver.

When the point cloud is divided into tiles, signaling information may be transmitted for each tile. When the point cloud is divided into slices, signaling information may be delivered for each slice.

According to embodiments, the partitioned slice may be included in the bitstream as shown in FIG. 26.

According to embodiments, the option information related to octree-based partitioning may be added to the SPS and signaled.

According to embodiments, the option information related to octree-based partitioning may be added to the TPS and signaled.

Accordingly, when the point cloud is divided into tiles, a different slice partitioning processing option may be applied to each tile.

The signaling information according to the embodiments may be selectively or redundantly included in various positions.

Slices according to embodiments may be included in one octree. Finally, points corresponding to leaf nodes of the octree may be encoded and/or decoded. Since occupancy codes of respective levels of the octree are encoded/decoded, a function of partially processing data may also be supported.

A sequence according to embodiments may have multiple tiles, a tile may have multiple slices, and a slice may include one octree. The SPS is at a sequence level, and the APS is also at the sequence level. The SPS contains more general information. The ASP contains more specific information in Attribute. In the TPS, when a sequence is divided into tiles, a different technique may be applied to each tile. When there is information configured in the APS and information configured in the TPS, the APS may be configured by default. When there is no configuration information in the TPS, a default may be used. When there is configuration information in the TPS, the reception method/device according to the embodiments may use the information of the TPS. In the attribute slice header, each tile may be divided into slices. That is, configuration information may be configured for each slice.

FIGS. 27 and 28 show detailed syntax of signaling information contained in the bitstream of the point cloud data in FIG. 24. To support the operation according to the embodiments, the transmission device and the reception device according to the embodiments may provide a signaling scheme as described below. The name of the signaling information may be understood within the scope of the meaning and function of the signaling information.

FIG. 27 shows a sequence parameter set (SPS) according to embodiments.

FIG. 27 shows the syntax of the SPS included in FIG. 26.

The transmission method/device according to the embodiments may add option information related to octree-based partitioning to the SPS and signal the same. The option information related to octree-based partitioning may be efficiently provided by being combined with sequence-related information.

profile_idc indicates a profile to which a bitstream according to embodiments conforms. Bitstreams may not contain values of profile_idc other than those according to the embodiments. Other values of profile_idc may be reserved for future use by ISO/IEC.

profile compatibility flags equal to 1 indicates that the bitstream conforms to the profile indicated by profile_idc equal to j.

sps_num_attribute_sets indicates the number of coded attributes in the bitstream. The value of sps_num_attribute_sets may be in the range of 0 to 63.

attribute_dimension[i] specifies the number of components of the i-th attribute.

attribute_instance_id[i] specifies the instance ID for the i-th attribute.

slice_partition_method_type indicates an applied slice partitioning type. For example, the following information may be transmitted according to the value of the type: 0=uniform geometry partitioning; 1=octree-base partitioning (see FIG. 15), 2=improved octree-based partitioning (see FIG. 17)). Specified information according to each integer value may be changed according to embodiments.

slice_partition_octree_subnode_arrangement_type indicates the order of regions of octree child nodes used in slice partitioning. Depending on this value, the following information may be transmitted: 0=zyx (which may be the default); 1=xyz; 2=xzy; 3=yxz; 4=yzx; 5=zxy. Specified information according to each integer value may be modified according to embodiments.

slice_partition_min_num_points_per_slice indicates the minimum number of points per slice in slice partitioning.

slice_partition_max_num_points_per_slice specifies the maximum number of points per slice in slice partitioning.

According to embodiments, when slice_partition_method_type >0, slice_partition_octree_subnode_arrangement_type, slice_partition_min_num_points_per_slice, slice_partition_max_num_points_per_slice, and the like according to embodiments may be delivered as parameter information.

The method/device for receiving point cloud data according to the embodiments may reconstruct the point cloud data with low latency based on the parameter information according to the embodiments.

According to embodiments, the SPS may further include parameters related to the sequence, not shown in the figure.

FIG. 28 shows a tile parameter set (TPS) according to embodiments.

FIG. 28 shows the syntax of the TPS of FIG. 27.

The transmission method/device according to the embodiments may add octree-based partitioning related information to the tile parameter set and signal the same. The TPS may effectively signal the following information together with tile-related parameters to support the function of octree-based partitioning.

slice_partition_method_type indicates the slice partitioning type applied to a corresponding tile. Depending on the value of this information, the following information may be delivered: 0=uniform geometry partition; 1=octree-base partition; 2=improved octree-based partition. Specified information according to each integer value may be modified according to embodiments.

slice_partition_octree_sub_node_arrangement_type indicates the order of regions of octree child nodes used in slice partitioning in a corresponding tile. Depending on the value of this information, the following information may be delivered: 0=zyx (default); 1=xyz; 2=xzy; 3=yxz; 4=yzx; 5=zxy. Specified information according to each integer value may be modified according to embodiments.

slice_partition_min_num_points_per_slice indicates the minimum number of points per slice in slice partitioning in a corresponding tile.

slice_partition_max_num_points_per_slice indicates the maximum number of points per slice in slice partitioning in a corresponding tile.

num_tiles specifies the number of tiles signaled for the bitstream. When not present, num_tiles may be inferred to be 0.

tile_bounding_box_offset_x[i] indicates the x offset of the i-th tile in the Cartesian coordinates. When not present, the value of tile_bounding_box_offset_x[0] may be inferred to be sps_bounding_box_offset_x.

tile_bounding_box_offset_y[i] indicates the y offset of the i-th tile in the Cartesian coordinates. When not present, the value of tile_bounding_box_offset_y[0] may be inferred to be sps_bounding_box_offset_y.

tile_bounding_box_offset_z[i] indicates the z offset of the i-th tile in the Cartesian coordinates.

According to embodiments, the TPS may further include tile related parameters, not shown in the figure.

The method/device for receiving point cloud data according to the embodiments may reconstruct the point cloud data with low latency based on the parameter information according to the embodiments.

Figure 29:
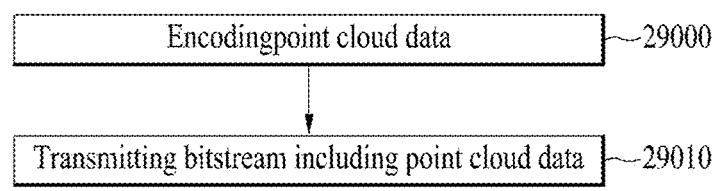
FIG. 29 illustrates a method of transmitting point cloud data according to embodiments.

FIG. 29 illustrates a method of transmitting point cloud data according to embodiments.

FIG. 29 illustrates a method of transmitting point cloud data according to embodiments, including the components and operations of FIGS. 1 to 28;

S29000: The point cloud data transmission method according to the embodiments may include encoding point cloud data. The encoding may include operations of the point cloud video encoder 10002 of FIG. 1, the encoding 20001 of FIG. 2, the encoder of FIG. 4, the transmission device of FIG. 12, the XR device 1430 of FIG. 14, partitioning of FIGS. 15 to 19, the point cloud encoder in FIG. 24, and the like.

S29010: The point cloud data transmission method may further include transmitting a bitstream including the point cloud data. The transmitting may include operations of the transmission device 1000, the transmitter 10003 of FIG. 1, the transmission 20002 of FIG. 2, the geometry bitstream and/or attribute bitstream transmission of FIG. 4, the transmission processor 12012 of FIG. 12, the signal transmission of the XR device 1430 of FIG. 14, the geometry information bitstream and/or attribute information bitstream transmission of FIG. 24, transmission of the point cloud bitstream of FIGS. 26 to 28, and the like.

Figure 30:
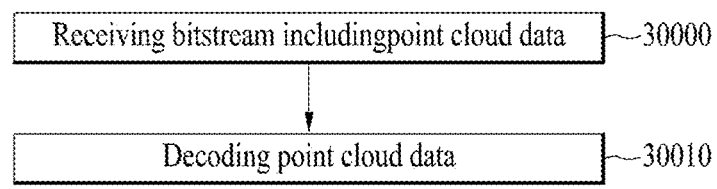
FIG. 30 illustrates a method of receiving point cloud data according to embodiments.

FIG. 30 illustrates a method of receiving point cloud data according to embodiments.

FIG. 30 illustrates a method of receiving point cloud data according to embodiments, including the components and operations of FIGS. 1 to 28;

S30000: The point cloud data reception method according to the embodiments may include receiving a bitstream including point cloud data. The receiving may include operations of the reception device 10004, the receiver 10007 of FIG. 1, reception according to the transmission 200025 of FIG. 2, and reception of the geometry bitstream and/or the attribute bitstream of FIG. 11, the receiver 13000 and/or the reception processor 13001 of FIG. 13, signal reception of the XR device 1430 of FIG. 14, the reception of the geometry information bitstream and/or the attribute information bitstream of FIG. 25, reception of a cloud bitstream of FIGS. 26 to 28, and the like.

S30010: The point cloud data reception method may further include decoding the point cloud data. The decoding may include operations of the point cloud video decoder 10006 of FIG. 1, the decoding 20003 of FIG. 2, the decoder of FIG. 10, the decoder of FIG. 11, the reception device of FIG. 13, signal transmission of the XR device 1430 of FIG. 14, decoding of the geometry bitstream and/or attribute information bitstream of FIG. 25, decoding of the point cloud bitstream of FIGS. 26 to 28, and the like.

The G-PCC geometry encoding/decoding operation according to the embodiments may efficiently perform octree-based point cloud slice partitioning, thereby providing effects related to real-time, low-delay, random access, and the like.

In order to efficiently utilize the structural advantage of the octree in the octree-based encoding/decoding according to the embodiment, nodes to be divided into slices may be extracted while traversing the octree. When slice partitioning is performed in this way, all conditions may be met. That is, the method/device according to the embodiments may eliminate the need to re-perform slice partitioning by changing the octree level, and the need to perform an additional splitting/merging operation, thereby shortening the execution time for slice partitioning. In addition, since the decoded points are not duplicated in the decoder, which is a condition for a slice, while the partitioned slices maintain the ideal number of points, the decoding operation may be efficiently performed.

Accordingly, the geometry-based point cloud compression (G-PCC) encoder/decoder for 3D point cloud data compression may provide effects related to real-time, low-delay, random access and the like. Point cloud streaming methods/functions suitable for various application scenarios may be provided through the slice partitioning method/function according to the embodiments.

The method/device (the transmission method/device and/or the reception method/device) according to the embodiments uses an improved octree-based slice partitioning operation that may efficiently use an octree-based structure, thereby efficiently encoding/decoding processing various types of point cloud data.

In the present disclosure, "A/B" may be interpreted as A and/or B.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "I" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

Mode for Disclosure

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that variously changes or modifications can be made to the embodiments within the scope of the embodiments.

Thus, it is intended that the embodiments cover the modifications and variations of this disclosure provided they come within the scope of the appended claims and their equivalents.

The invention claimed is:

1. A method, comprising:
    encoding geometry data of point cloud data based on partial slices,
    wherein the partial slices are generated based on an octree for the geometry data,
    wherein a size of a first partial slice is different from a size of a second partial slice,
    wherein a depth of the octree related to the first partial slice is different from a depth of the octree related to the second partial slice; and
    encoding attribute data of the point cloud data,
    wherein the encoded geometry data and the encoded attribute data are included in a bitstream,
    wherein the bitstream includes information for representing whether or not the geometry data is encoded based on the partial slices.

2. The method of claim 1, wherein the encoding comprises:
    quantizing geometry data of the point cloud data.

3. The method of claim 1, wherein the encoding comprises:
    visiting a node of the octree generated from geometry data of the point cloud data; and
    checking a number of points included in the node.

4. The method of claim 3, wherein, based on the number of points included in the node being greater than a first value, a left child node of the node is visited.

5. The method of claim 3, wherein, based on the number of points included in the node being between a first value and a second value, a slice is partitioned based on the node.

6. The method of claim 3, wherein, based on the number of points included in the node being less than a second value, a right node belonging to a parent node of the node is visited.

7. A device, comprising:
    a memory; and
    at least one processor connected to the memory, the at least one processor configured to:
    encode geometry data of point cloud data based on partial slices,
    wherein the partial slices are generated based on an octree for the geometry data,
    wherein a size of a first partial slice is different from a size of a second partial slice,
    wherein a depth of the octree related to the first partial slice is different from a depth of the octree related to the second partial slice; and
    encode attribute data of the point cloud data,
    wherein the encoded geometry data and the encoded attribute data are included in a bitstream,
    wherein the bitstream includes information for representing whether or not the geometry data is encoded based on the partial slices.

8. The device of claim 7, wherein the at least one processor is further configured to:
    quantize geometry data of the point cloud data.

9. The device of claim 7, wherein the at least one processor is further configured to: visit a node of an octree generated from geometry data of the point cloud data, and checks a number of points included in the node.

10. The device of claim 9, wherein, based on the number of points included in the node being greater than a first value, the at least one processor is further configured to: visit a left child node of the node.

11. The device of claim 9, wherein, based on the number of points included in the node being between a first value and a second value, the at least one processor is further configured to: perform partitioning a slice based on the node.

12. The device of claim 9, wherein, based on the number of points included in the node being less than a second value, the at least one processor is further configured to: visit a right node belonging to a parent node of the node.

13. A method, comprising:
    decoding geometry data of point cloud data based on partial slices,
    wherein the partial slices are generated based on an octree for the geometry data,
    wherein a size of a first partial slice is different from a size of a second partial slice,
    wherein a depth of the octree related to the first partial slice is different from a depth of the octree related to the second partial slice; and
    decoding attribute data of the point cloud data,
    wherein a bitstream including the point cloud data includes information for representing whether or not the geometry data is encoded based on the partial slices.

14. A device, comprising:
    a memory; and
    at least one processor connected to the memory, the at least one processor configured to:
    decode geometry data of point cloud data based on partial slices,
    wherein the partial slices are generated based on an octree for the geometry data,
    wherein a size of a first partial slice is different from a size of a second partial slice,
    wherein a depth of the octree related to the first partial slice is different from a depth of the octree related to the second partial slice; and
    decode attribute data of the point cloud data,
    wherein a bitstream including the point cloud data includes information for representing whether or not the geometry data is encoded based on the partial slices.

* * * * *